(12) United States Patent
Sablak et al.

(10) Patent No.: US 11,153,534 B2
(45) Date of Patent: Oct. 19, 2021

(54) VIRTUAL MASK FOR USE IN AUTOTRACKING VIDEO CAMERA IMAGES

(71) Applicants: Robert Bosch GMBH, Stuttgart (DE); Bosch Security Systems, Inc., Fairport, NY (US)

(72) Inventors: Sezai Sablak, Lancaster, PA (US); Geza Papp, Lancaster, PA (US); Michael D. Bolotine, Denver, PA (US)

(73) Assignees: Robert Bosch GMBH, Stuttgart (DE); Bosch Security Systems, Inc., Fairport, NY (US)

( * ) Notice: Subject to any disclaimer, the term of this patent is extended or adjusted under 35 U.S.C. 154(b) by 393 days.

(21) Appl. No.: 14/850,145

(22) Filed: Sep. 10, 2015

(65) Prior Publication Data
US 2016/0006991 A1 Jan. 7, 2016

Related U.S. Application Data

(63) Continuation of application No. 11/199,762, filed on Aug. 9, 2005, now Pat. No. 9,210,312, which is a
(Continued)

(51) Int. Cl.
*H04N 5/225* (2006.01)
*H04N 7/18* (2006.01)
(Continued)

(52) U.S. Cl.
CPC ......... *H04N 7/183* (2013.01); *G06K 9/00771* (2013.01); *G06K 9/3233* (2013.01);
(Continued)

(58) Field of Classification Search
CPC .... H04N 7/183; H04N 5/23299; H04N 5/144; H04N 5/23216; H04N 7/18;
(Continued)

(56) References Cited

U.S. PATENT DOCUMENTS 3,943,561 A 3/1976 Biddlecomb
4,403,256 A 9/1983 Green et al.
(Continued)

FOREIGN PATENT DOCUMENTS

CN 1402551 3/2003
CN 1404696 3/2003
(Continued)

OTHER PUBLICATIONS

Product Brochure, Fire Sentry Corporation, VSD-8 Visual Smoke Detection System, 2001.
(Continued)

*Primary Examiner* — Richard T Torrente
(74) *Attorney, Agent, or Firm* — Faegre Drinker Biddle & Reath LLP

(57) ABSTRACT

A surveillance camera system includes a camera that acquires images and that has an adjustable field of view. A processing device is operably coupled to the camera. The processing device allows a user to define a virtual mask within the acquired images. The processing device also tracks a moving object of interest in the acquired images with a reduced level of regard for areas of the acquired images that are within the virtual mask.

17 Claims, 15 Drawing Sheets

Related U.S. Application Data continuation-in-part of application No. 10/858,817, filed on Jun. 2, 2004, now Pat. No. 8,212,872.

(51) Int. Cl.

| | | |
|---|---|---|
| *G06K 9/00* | (2006.01) | |
| *G06K 9/32* | (2006.01) | |
| *G06T 3/00* | (2006.01) | |
| *G06T 7/20* | (2017.01) | |
| *G06T 19/00* | (2011.01) | |
| *G08B 13/196* | (2006.01) | |
| *G06T 7/194* | (2017.01) | |
| *G06T 7/215* | (2017.01) | |
| *H04N 5/232* | (2006.01) | |
| *G01S 3/786* | (2006.01) | |
| *G06K 9/36* | (2006.01) | |

(52) U.S. Cl.
CPC ............... *G06T 3/00* (2013.01); *G06T 7/194* (2017.01); *G06T 7/20* (2013.01); *G06T 7/215* (2017.01); *G06T 19/006* (2013.01); *G08B 13/19606* (2013.01); *G08B 13/19634* (2013.01); *G08B 13/19652* (2013.01); *G08B 13/19686* (2013.01); *H04N 5/23216* (2013.01); *H04N 5/23299* (2018.08); *H04N 7/18* (2013.01); *G01S 3/7864* (2013.01); *G06K 2009/366* (2013.01); *G06T 2207/30232* (2013.01); *H04N 5/23218* (2018.08)

(58) Field of Classification Search
CPC ..... H04N 5/23218; G06T 7/194; G06T 7/215; G06T 3/00; G06T 7/20; G06T 19/006; G06T 2207/30232; G08B 13/19606; G08B 13/19634; G08B 13/19652; G08B 13/19686; G01S 3/7864; G06K 2009/366; G06K 9/00771; G06K 9/3233
See application file for complete search history.

(56) References Cited

U.S. PATENT DOCUMENTS

| | | | |
|---|---|---|---|
| 4,410,914 A | 10/1983 | Siau | |
| 4,458,266 A * | 7/1984 | Mahoney | G08B 13/19606 340/541 |
| 4,476,494 A | 10/1984 | Tugayé | |
| 4,714,961 A | 12/1987 | Haubold et al. | |
| 4,897,719 A | 1/1990 | Griffin | |
| 4,959,725 A | 9/1990 | Mandle | |
| 5,012,347 A | 4/1991 | Fournier | |
| 5,237,405 A | 8/1993 | Egusa et al. | |
| 5,264,933 A | 11/1993 | Rosser et al. | |
| 5,353,392 A | 10/1994 | Luquet et al. | |
| 5,371,539 A | 12/1994 | Okino et al. | |
| 5,430,480 A | 7/1995 | Allen et al. | |
| 5,434,617 A * | 7/1995 | Bianchi | G01S 3/7865 348/169 |
| 5,436,672 A | 7/1995 | Medioni et al. | |
| 5,438,360 A | 8/1995 | Edwards | |
| 5,491,517 A | 2/1996 | Kreitman et al. | |
| 5,502,482 A | 3/1996 | Graham | |
| 5,517,236 A | 5/1996 | Sergeant et al. | |
| 5,528,319 A | 6/1996 | Austin | |
| 5,563,652 A | 10/1996 | Toba et al. | |
| 5,608,703 A | 3/1997 | Washisu | |
| 5,610,653 A | 3/1997 | Abeassis | |
| 5,627,616 A | 5/1997 | Sergeant et al. | |
| 5,629,984 A | 5/1997 | McManis | |
| 5,629,988 A | 5/1997 | Burt et al. | |
| 5,648,815 A | 7/1997 | Toba | |
| 5,731,846 A | 3/1998 | Kreitman et al. | |
| 5,754,225 A | 5/1998 | Naganuma | |
| 5,798,786 A | 8/1998 | Lareau et al. | |
| 5,798,787 A | 8/1998 | Yamaguchi et al. | |
| 5,801,770 A | 9/1998 | Paff et al. | |
| 5,835,138 A | 11/1998 | Kondo | |
| 5,909,242 A | 6/1999 | Kobayashi et al. | |
| 5,926,212 A | 7/1999 | Kondo | |
| 5,953,079 A | 9/1999 | Burl et al. | |
| 5,963,248 A | 10/1999 | Ohkawa et al. | |
| 5,963,371 A | 10/1999 | Needham et al. | |
| 5,969,755 A | 10/1999 | Courtney | |
| 5,973,733 A | 10/1999 | Gove | |
| 5,982,420 A | 11/1999 | Ratz | |
| 6,067,399 A | 5/2000 | Berger | |
| 6,100,925 A | 8/2000 | Rosser et al. | |
| 6,144,405 A | 11/2000 | Toba | |
| 6,154,317 A | 11/2000 | Segerstrom et al. | |
| 6,173,087 B1 | 1/2001 | Kumar | |
| 6,181,345 B1 | 1/2001 | Richard | |
| 6,208,379 B1 | 3/2001 | Oya et al. | |
| 6,208,386 B1 | 3/2001 | Wilf et al. | |
| 6,211,912 B1 | 4/2001 | Shahraray | |
| 6,211,913 B1 | 4/2001 | Hansen et al. | |
| 6,263,088 B1 | 7/2001 | Crabtree et al. | |
| 6,295,367 B1 | 9/2001 | Crabtree et al. | |
| 6,384,871 B1 | 5/2002 | Wilf et al. | |
| 6,396,961 B1 | 5/2002 | Wixson et al. | |
| 6,424,370 B1 | 7/2002 | Courtney | |
| 6,437,819 B1 | 8/2002 | Loveland | |
| 6,441,864 B1 | 8/2002 | Minami et al. | |
| 6,442,474 B1 | 8/2002 | Trajkovic et al. | |
| 6,459,822 B1 | 10/2002 | Hathaway et al. | |
| 6,478,425 B2 | 11/2002 | Trajkovic et al. | |
| 6,509,926 B1 | 1/2003 | Mills et al. | |
| 6,628,711 B1 | 9/2003 | Mathew et al. | |
| RE38,420 E | 2/2004 | Thomas | |
| 6,727,938 B1 | 4/2004 | Randall | |
| 6,734,901 B1 | 5/2004 | Kudo et al. | |
| 6,744,461 B1 | 6/2004 | Wada et al. | |
| 6,778,210 B1 | 8/2004 | Sugahara et al. | |
| 6,781,622 B1 | 8/2004 | Sato et al. | |
| 6,993,158 B2 | 1/2006 | Cho et al. | |
| 7,218,342 B2 | 5/2007 | Kobayashi et al. | |
| 7,382,936 B2 | 6/2008 | Yajima | |
| 2002/0008758 A1 | 1/2002 | Broemmelsiek et al. | |
| 2002/0030741 A1 | 3/2002 | Broemmelsiek | |
| 2002/0140813 A1 | 10/2002 | Trajkovic et al. | |
| 2002/0140814 A1 | 10/2002 | Cohen-Solal et al. | |
| 2002/0167537 A1 | 11/2002 | Trajkovic | |
| 2002/0168091 A1 | 11/2002 | Trajkovic | |
| 2003/0103139 A1 | 6/2003 | Pretzer et al. | |
| 2003/0108240 A1* | 6/2003 | Gutta | G06T 5/002 382/181 |
| 2003/0137589 A1 | 7/2003 | Miyata | |
| 2003/0227555 A1 | 12/2003 | Kobayashi et al. | |
| 2004/0130628 A1 | 7/2004 | Stavely | |
| 2005/0157169 A1* | 7/2005 | Brodsky | G01S 3/7864 348/143 |

FOREIGN PATENT DOCUMENTS

| | | |
|---|---|---|
| CN | 1466372 | 1/2004 |
| EP | 0557007 A2 | 8/1993 |
| EP | 1 081 955 A2 | 3/2001 |
| GB | 2305051 A | 3/1997 |
| GB | 2316255 A | 2/1998 |
| GB | 2411310 A | 8/2005 |
| GB | 2414885 A | 12/2005 |
| JP | 62229082 | 10/1987 |
| JP | 032786211 | 12/1991 |
| JP | H0750825 | 2/1995 |
| JP | 08-123784 A | 5/1996 |
| JP | 2001-061137 A | 3/2001 |
| JP | 2003061076 | 2/2003 |
| JP | 2004080669 | 3/2004 |
| JP | 2004146890 | 5/2004 |
| JP | 2004222200 | 8/2004 |
| WO | WO 94/28377 | 12/1994 |

(56) References Cited

FOREIGN PATENT DOCUMENTS

| WO | WO 98/47117 A1 | 10/1998 |
|---|---|---|
| WO | WO 01/69930 A1 | 9/2001 |
| WO | WO 01/69932 A1 | 9/2001 |

OTHER PUBLICATIONS

New Product Announcement, Integral Technologies, Inc., First Line DVA Digital Recorder,—Mar. 1, 2002.
Products Brochure, Primary Image, Videotracker Digital Video Motion Detector, 1998.
Haritaoglu, et al., "W4: Who? When? Where? What? A Real Time System for Detecting and Tracking People," International Conference on Face and Gesture Recognition, Nara, Japan, Apr. 14-16, 1998.
J. Segen and G. Pingali, "A Camera-Based System for Tracking People in Real Time," In Proc. International Conference on Pattern Recognition, pp. 63-67, 1996.
C.R. Wren, A. Azarbayejani, T. Darrell, and A.P. Pentland, "Pfinder: Real-Time Tracking of the Human Body," IEEE Trans. Pattern Analysis and Machine Intelligence, 19(7): 780-785, Jul. 1997.
T.E. Boult, R. Michaels, A. Erkan, P. Lewis, C. Powers, C Qian, and W. Yin, "Frame-Rate Multi-Body Tracking for Surveillance," Proceeding of the DARPA Image Understanding Workshop, Nov. 1998.
Haritaoglu, D. Harwood, and L.S. Davis, "W4: Real-Time Surveillance of People and Their Activities," IEEE Trans. Pattern Analysis and Machine Intelligence, 22(8): 809-830, Aug. 2000.
"Fast Normalized Cross-Correlation," J.P. Lewis, expanded version of a paper from Vision Interface, 1995 (Reference [10]).
"Stabilization, restoration and resolution enhancement of a video sequence captured by a moving and vibrating platform," A. Stern et al., Applications of Digital Image Processing XXIV, Pgs of SPIE vol. 4472 (2001) pp. 65-745/25/04.
"A Stable Vision System for Moving Vehicles," Jesse S. Jin et al., IEEE Transactions of Intelligent Transportation System, vol. 1, No. 1, Mar. 2000, pp. 32-39.
"Camera Tracking for Augmented Reality Media," Bolan Jiang et al., 2000 IEEE, vol. III, pp. 1637-1640.
"Computer vision sensor for autonomous helicopter hover stabilization," Carl-Henrik Oertel, SPIE vol. 3088, pp. 121-129 (1977).
"Development of image stabilization system for remote operation of walking robots," Kurazume et al., IEEE vol. 2, pp. 1856-1861 (2000).
Dynamic Stabilization of a Pan and Tilt Camera for Submarine Image Visualization, Armel Cretual et al., Computer Vision and Image Understanding 79, pp. 47-65 (2000).

\* cited by examiner

VIRTUAL MASK FOR USE IN AUTOTRACKING VIDEO CAMERA IMAGES

CROSS REFERENCE TO RELATED APPLICATIONS

This application is a continuation application of U.S. patent application Ser. No. 11/199,762, filed Aug. 9, 2005, titled VIRTUAL MASK FOR USE IN AUTOTRACKING VIDEO CAMERA IMAGES, which is a continuation-in-part of U.S. patent application Ser. No. 10/858,817, entitled TRANSFORMABLE PRIVACY MASK FOR VIDEO CAMERA IMAGES, filed on Jun. 2, 2004, which are hereby incorporated by reference.

BACKGROUND OF THE INVENTION

1. Field of the Invention

The present invention relates to a method of using a video camera to automatically track a moving object of interest in the camera's field of view and, more particularly, to a method of reducing the effects of other moving objects in the field of view on the tracking of the object of interest.

2. Description of the Related Art

Video surveillance camera systems are found in many locations and may include either fixed cameras that have a fixed field of view and/or adjustable cameras that can pan, tilt and/or zoom to adjust the field of view of the camera. The video output of such cameras is typically communicated to a central location where it is displayed on one of several display screens and where security personnel may monitor the display screens for suspicious activity.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith. Control signals for directing the pan, tilt, zoom movements typically originate from a human operator via a joystick or from an automated video tracking system. An automated video tracking (i.e., "autotracking") system may identify a moving object in the field of view and then track the object by moving the camera such that the moving object is maintained in the central portion of the camera's field of view.

An autotracking system may identify a moving object in the field of view by comparing several sequentially obtained images in the field of view. A change in the content of an individual pixel, or of a localized group of pixels, between sequentially obtained images may indicate the presence of a moving object that needs to be tracked. It is known for an autotracking system to create a "motion mask", which is a pixel-by-pixel quantification of the amount, or probability, of content change in the pixels between sequentially obtained images. By identifying groupings of pixels that have had changes of content between sequentially obtained images, the system can identify a moving object within the field of view.

There have been identified several problems in relation to the use of autotracking systems. For example, the autotracking system may issue an alarm when it detects a suspicious moving object that could possibly be an intruder. A problem, however, is that the system may issue false alarms when it detects "static movement", i.e., background movement, that the system interprets as a suspicious target. An example of a source of such static movement is a flag waving in the breeze. A related problem is that the presence of static movement in the field of view may cause inefficiency in tracking actual suspicious targets. Lastly, the presence of static movement in the field of view may confuse the system and cause the system to lose track of an actual suspicious target.

Although various systems have addressed the need to provide motion masks in a surveillance camera system, none have addressed the need to filter out static movement when using motion masks in an autotracking surveillance system.

SUMMARY OF THE INVENTION

The present invention provides a surveillance camera autotracking system that creates a virtual mask that is indicative of the locations of static movement. The motion mask may be modified by use of the virtual mask such that the system is less affected by the presence of static movement while the system is examining the motion mask for the presence of a moving object of interest.

The present invention may provide: 1) a method for an automated transformable virtual masking system to be usable with a PTZ camera; 2) a method for providing a virtual mask having a very flexible shape with as many vertices as the user may draw; 3) a method for providing continuous transformable virtual masking of static motions for a more robust autotracking system; 4) a method to enable the acquisition of non-stationary images as well as stationary images; 5) a method to enable dynamic zooming, facilitating accurate privacy masking, as opposed to making size changes with constant shapes; 6) a virtual masking system that does not require a camera calibration procedure.

The invention comprises, in one form thereof, a surveillance camera system including a camera that acquires images and that has an adjustable field of view. A processing device is operably coupled to the camera. The processing device allows a user to define a virtual mask within the acquired images. The processing device also tracks a moving object of interest in the acquired images with a reduced level of regard for of the acquired images that are within the virtual mask.

The invention comprises, in another form thereof, a method of operating a surveillance camera system, including acquiring images with a camera. A virtual mask is defined within the acquired images. A moving object of interest is tracked in the acquired images with a reduced level of regard for areas of the acquired images that are within the virtual mask.

The invention comprises, in yet another form thereof, a method of operating a surveillance camera system, including acquiring images with a camera. A motion mask is created based upon the acquired images. A source of static motion is located within the acquired images. A virtual mask is defined over the source of static motion within the acquired images. The motion mask is modified by use of the virtual mask. A moving object of interest is tracked in the acquired images based upon the modified motion mask.

An advantage of the present invention is that it the automated transformable masking algorithm increases the robustness of an auto-tracker system, and reduces disruptions by sources of static motions such as flags, trees, or fans.

Another advantage is that the virtual mask may be finely tailored to the shape of the area in which motion is to be disregarded for purposes of autotracking.

Yet another advantage is that the present invention may also allow for a virtual mask in which there is an unmasked area that is entirely surrounded by a masked area, e.g., a donut-shaped mask.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
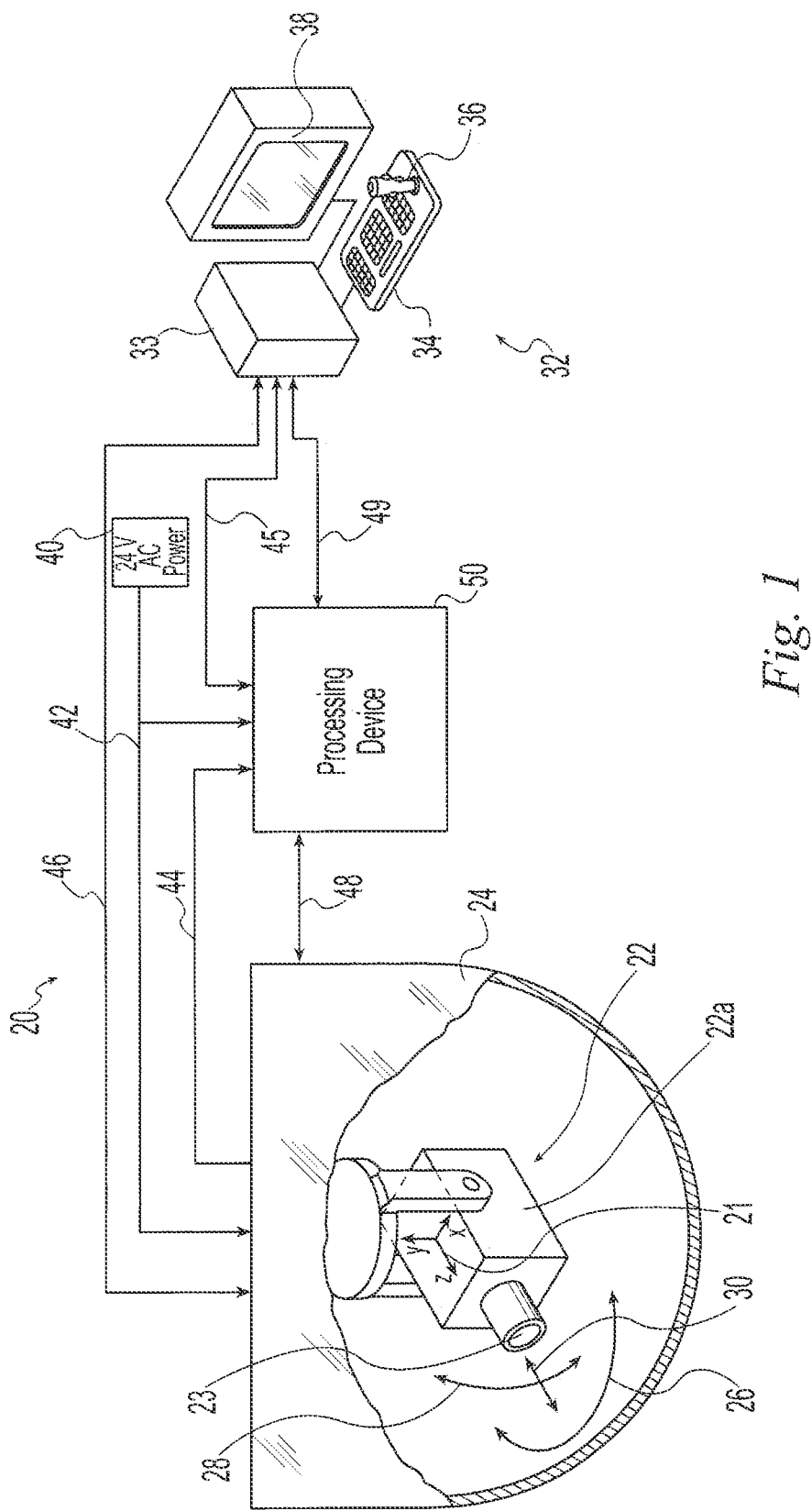
FIG. 1 is a schematic view of a video surveillance system in accordance with the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

In accordance with the present invention, a video surveillance system 20 is shown in FIG. 1. System 20 includes a camera 22 which is located within a partially spherical enclosure 24. Enclosure 24 is tinted to allow the camera to acquire images of the environment outside of enclosure 24 and simultaneously prevent individuals in the environment who are being observed by camera 22 from determining the orientation of camera 22. Camera 22 includes motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion corresponds to movement along the x-axis, tilting motion corresponds to movement along the y-axis and focal length adjustment corresponds to movement along the z-axis. In the illustrated embodiment, camera 22 and enclosure 24 are a Philips AutoDome® Camera Systems brand camera system, such as the G3 Basic AutoDome® camera and enclosure, which are available from Bosch Security Systems, Inc. formerly Philips Communication, Security & Imaging, Inc. having a place of business in Lancaster, Pa. A camera suited for use with the present invention is described by Sergeant et al. in U.S. Pat. No. 5,627,616, entitled Surveillance Camera System, which is hereby incorporated herein by reference.

System 20 also includes a head end unit 32. Head end unit 32 may include a video switcher or a video multiplexer 33. For example, the head end unit may include an Allegiant brand video switcher available from Bosch Security Systems, Inc. formerly Philips Communication, Security & Imaging, Inc. of Lancaster, Pa. such as a LTC 8500 Series Allegiant Video Switcher which provides inputs for up to sixty-four cameras and may also be provided with eight independent keyboards and eight monitors. Head end unit 32 includes a keyboard 34 and joystick 36 for operator or user input. Head end unit 32 also includes a display device in the form of a monitor 38 for viewing by the operator. A 24 volt AC power source 40 is provided to power both camera 22 and a processing device 50. Processing device 50 is operably coupled to both camera 22 and head end unit 32.

Illustrated system 20 is a single camera application, however, the present invention may be used within a larger surveillance system having additional cameras which may be either stationary or moveable cameras or some combination thereof to provide coverage of a larger or more complex surveillance area. One or more VCRs or other form of analog or digital recording device may also be connected to head end unit 32 to provide for the recording of the video images captured by camera 22 and other cameras in the system.

Figure 2:
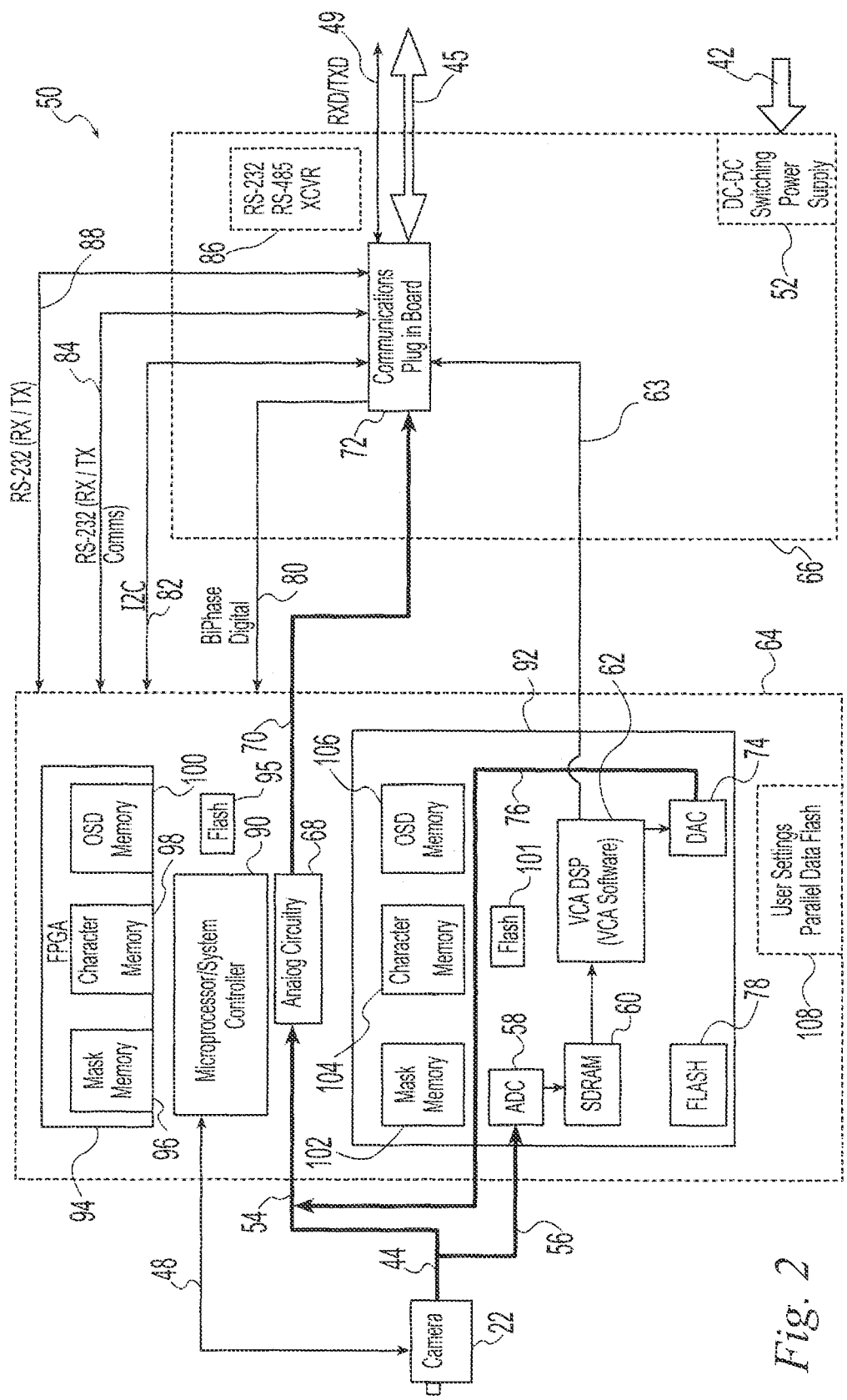
FIG. 2 is a schematic view of the processing device of FIG. 1.

The hardware architecture of processing device 50 is schematically represented in FIG. 2. In the illustrated embodiment, processing device 50 includes a system controller board 64. A power supply/IO section 66 of processing device 50 is illustrated as a separate board in FIG. 2, however, this is done for purposes of clarity and the components of power supply/IO section 66 may be directly mounted to system controller board 64. A power line 42 connects power source 40 to converter 52 in order to provide power to processing device 50. Processing device 50 receives a raw analog video feed from camera 22 via video line 44, and video line 45 is used to communicate video images to head end unit 32. In the illustrated embodiment, video lines 44, 45 are coaxial, 75 ohm, 1 Vp-p and include BNC connectors for engagement with processing device 50. The video images provided by camera 22 can be analog and may conform to either NTSC or PAL standards. Board 72 can be a standard communications board capable of handling biphase signals and including a coaxial message integrated circuit (COMIC) for allowing two-way communication over video links.

Via another analog video line 56, an analog-to-digital converter 58 receives video images from camera 22 and converts the analog video signal to a digital video signal. After the digital video signal is stored in a buffer in the form of SDRAM 60, the digitized video images are passed to video content analysis digital signal processor (VCA DSP) 62. A video stabilization algorithm is performed in VCA DSP 62. Examples of image stabilization systems that may be employed by system 20 are described by Sablak et al. in a U.S. Patent Applications entitled "IMAGE STABILIZATION SYSTEM AND METHOD FOR A VIDEO CAMERA", filed on the same date as the present application and having a common assignee with the present application, the disclosure of which is hereby incorporated herein by reference. The adjusted display image is sent to digital-to-analog converter 74 where the video signal is converted to an analog signal. The resulting annotated analog video signal is sent via analog video lines 76, 54, analog circuitry 68 and analog video line 70 to communications plug-in board 72, which then sends the signal to head end unit 32 via video line 45.

Processor 62 may be a TIDM 642 multimedia digital signal processor available from Texas Instruments Incorporated of Dallas, Tex. At start up, the programmable media processor 62 loads a bootloader program. The boot program then copies the VCA application code from a memory device such as flash memory 78 to SDRAM 60 for execution. In the illustrated embodiment, flash memory 78 provides four megabytes of memory and SDRAM 60 provides thirty-two megabytes of memory. Because the application code from flash memory 78 is loaded on SDRAM 60 upon start up, SDRAM 60 is left with approximately twenty-eight megabytes of memory for video frame storage and other software applications.

In the embodiment shown in FIG. 2, components located on system controller board 64 are connected to communications plug-in board 72 via a high speed serial communications bus 63, biphase digital data bus 80, an I2C data bus 82, and RS-232 data buses 84, 88. An RS-232/RS-485 compatible transceiver 86 may also be provided for communication purposes. Coaxial line 45 provides communication between processing device 50 and head end unit 32 via communications plug in board 72. Various additional lines, such as line 49, which can be in the form of an RS-232 debug data bus, may also be used to communicate signals from head end unit 32 to processing device 50. The signals communicated by these lines, e.g., lines 45 and 49, can include signals that can be modified by processing device 50 before being sent to camera 22. Such signals may be sent to camera 22 via line 48 in communication with a microcontroller 90. In the illustrated embodiment, microcontroller 90 is a H8S/2378 controller commercially available from Renesas Technology America, Inc. having a place of business in San Jose, Calif.

Microcontroller 90 operates system controller software and is also in communication with VCA components 92. Although not shown, conductive traces and through-hole vias lined with conductive material are used provide electrical communication between the various components mounted on the printed circuit boards depicted in FIG. 2. Thus, VCA components such as VCA DSP 62 can send signals to camera 22 via microcontroller 90 and line 48. It is also possible for line 46 to be used to communicate signals directly to camera 22 from head end unit 32 without communicating the signals through processing device 50. Various alternative communication links between processing device 50 and camera 22 and head unit 32 could also be employed with the present invention.

System controller board 64 also includes a field programmable gate array (FPGA) 94 including three memory devices, i.e., a mask memory 96, a character memory 98, and an on-screen display (OSD) memory 100. In the illustrated embodiment, FPGA 94 may be a FPGA commercially available from Xilinx, Inc. having a place of business in San Jose, Calif. and sold under the name Spartan 3. In the illustrated embodiment, mask memory 96 is a 4096×16 dual port random access memory module, character memory 98 is a 4096×16 dual port random access memory module, and OSD memory 100 is a 1024×16 dual port random access memory module. Similarly, VCA components 92 includes a mask memory 102, a character memory 104, and an on-screen display (OSD) memory 106 which may also be dual port random access memory modules. These components may be used to mask various portions of the image displayed on-screen 38 or to generate textual displays for screen 38. More specifically, this configuration of processing device 50 enables the processor to apply privacy masks, virtual masks, and on-screen displays to either an analog video signal or a digital video signal.

If it is desired to apply the privacy masks and on-screen displays to a digital image signal, memories 102, 104 and 106 would be used and the processing necessary to calculate the position of the privacy masks and on-screen displays would take place in processor 62. If the privacy masks and on-screen displays are to be applied to an analog video signal, memories 96, 98, and 100 would be used and the processing necessary calculate the position of the privacy masks and on-screen displays would take place in microprocessor 90. The inclusion of VCA components 92, including memories 102, 104, 106 and processor 62, in processing device 50 facilitates video content analysis, such as for the automated tracking of intruders. Alternative embodiments of processing device 50 which do not provide the same video content analysis capability, however, may be provided without VCA components 92 to thereby reduce costs. In such an embodiment, processing device 50 would still be capable of applying privacy masks, virtual masks, and on-screen displays to an analog video signal through the use of microprocessor 90 and field programmable array (FPGA) 94 with its memories 96, 98, and 100.

Processing device 50 also includes rewritable flash memory devices 95, 101. Flash memory 95 is used to store data including character maps that are written to memories 98 and 100 upon startup of the system. Similarly flash memory 101 is used to store data including character maps that are written to memories 104 and 106 upon startup of the system. By storing the character map on a rewritable memory device, e.g., either flash memory 95, 101, instead of a read-only memory, the character map may be relatively easily upgraded at a later date if desired by simply overwriting or supplementing the character map stored on the flash memory. System controller board 64 also includes a parallel data flash memory 108 for storage of user settings including user-defined privacy masks wherein data corresponding to the user-defined privacy masks may be written to memories 96 and/or 102 upon startup of the system.

Figure 3:
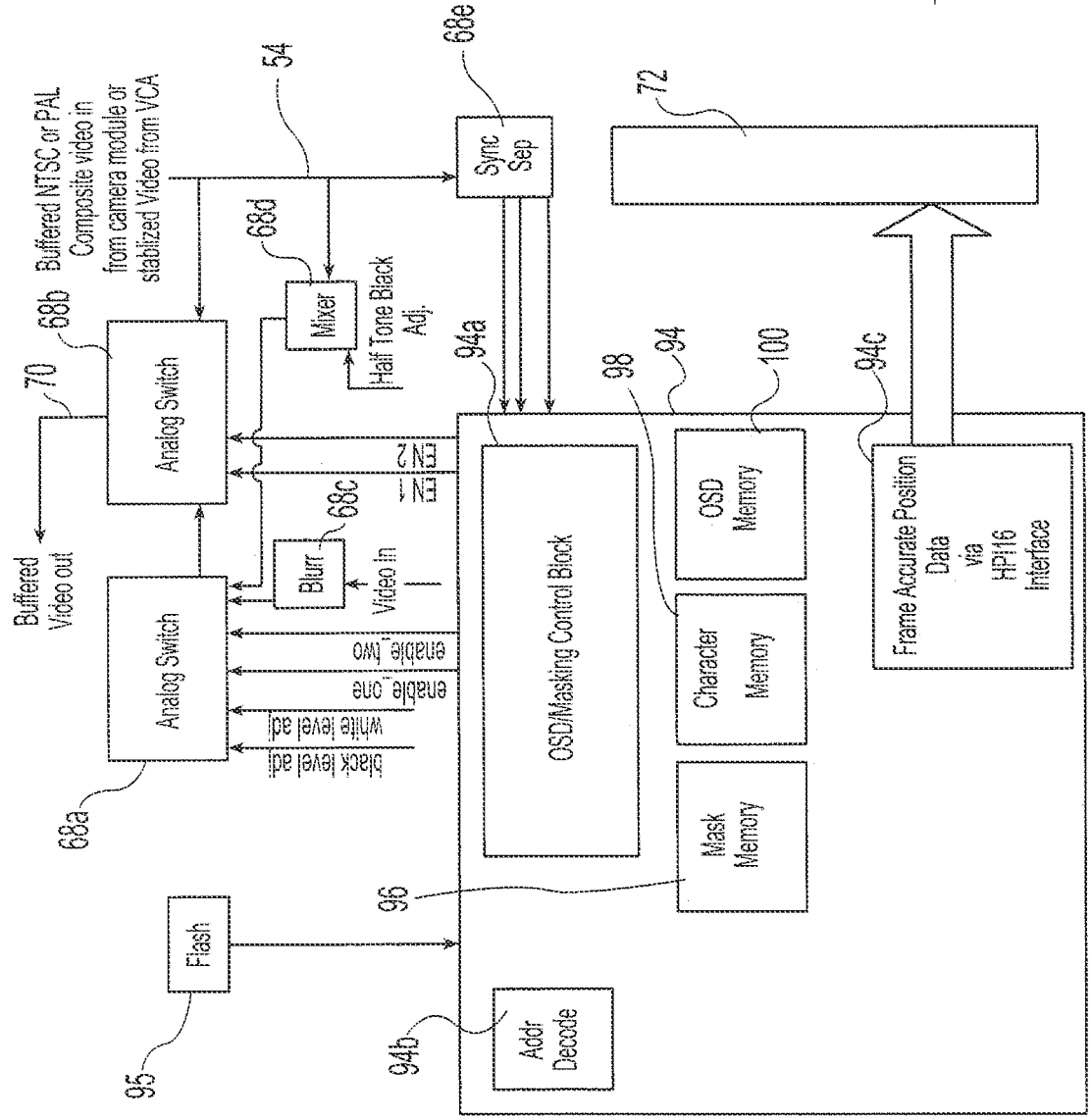
FIG. 3 is a schematic view of a portion of the processing device which may be used with an analog video signal.

FIG. 3 provides a more detailed schematic illustration of FPGA 94 and analog circuitry 68 than that shown in FIG. 2. As seen in FIG. 3, in addition to mask memory 96, character memory 98 and OSD memory 100, FPGA 94 also includes an OSD/Masking control block 94a, an address decoder 94b, and an optional host-port interface HPI16 94c for communicating frame accurate position data. The HPI16 interface is used when the privacy mask and informational displays, e.g., individual text characters, are to be merged with a digital video image using VCA components 92.

As also seen in FIG. 3, analog circuitry (shown in a more simplified manner and labeled 68 in FIG. 2) includes a first analog switch 68*a*, a second analog switch 68*b*, a filter 68*c*, an analog multiplexer 68*d*, and a video sync separator 68*e*. A "clean" analog video signal, i.e., although the image may be stabilized, the video signal includes substantially all of the image captured by camera 22 without any substantive modification to the content of the image, is conveyed by line 54 to the second analog switch 68*b*, mixer 68*c* and sync separator 68*e*. An analog video signal is conveyed from mixer 68*c* to first analog switch 68*a*. Mixer 68*c* also includes a half tone black adjustment whereby portions of the video signal may be modified with a grey tone. Sync separator 68*e* extracts timing information from the video signal which is then communicated to FPGA 94. A clean analog video signal, such as from FPGA 94 or line 54, is also received by filter 68*c*. Passing the analog video signal through filter 68*c* blurs the image and the blurred image is communicated to analog switch 68*a*. Analog switch 68*a* also has input lines which correspond to black and white inputs. Two enable lines provide communication between analog switch 68*a* and FPGA 94. The two enable lines allow FPGA 94 to control which input signal received by analog switch 68*a* is output to analog switch 68*b*. As can also be seen in FIG. 3, second analog switch 68*b* includes two input lines, one corresponding to a "clean" analog video signal from line 54 and the output of analog switch 68*a*. Two enable lines provide communication between analog switch 68*b* and FPGA 94 whereby FPGA 94 controls which signal input into analog switch 68*b* is output to line 70 and subsequently displayed on display screen 38.

Each individual image, or frame, of the video sequence captured by camera 22 is comprised of pixels arranged in a series of rows and the individual pixels of each image are serially communicated through analog circuitry 68 to display screen 38. When analog switch 68*b* communicates clean video signals to line 70 from line 54, the pixels generated from such a signal will generate on display screen 38 a clear and accurate depiction of a corresponding portion of the image captured by camera 22. To blur a portion of the image displayed on-screen 38 (and thereby generate a privacy mask or indicate the location of a virtual mask), analog switch 68*a* communicates a blurred image signal, corresponding to the signal received from filter 68*c*, to analog switch 68*b*. Switch 68*b* then communicates this blurred image to line 70 for the pixels used to generate the selected portion of the image that corresponds to the privacy mask or the virtual mask. If a grey tone privacy mask or virtual mask is desired, the input signal from mixer 68*d* (instead of the blurred image signal from filter 68*c*) can be communicated through switches 68*a* and 68*b* and line 70 to display screen 38 for the selected portion of the image. To generate on-screen displays, e.g., black text on a white background, analog switch 68*a* communicates the appropriate signal, either black or white, for individual pixels to generate the desired text and background to analog switch 68*b* which then communicates the signal to display screen 38 through line 70 for the appropriate pixels. Thus, by controlling switches 68*a* and 68*b*, FPGA 94 generates privacy masks and informational displays on display screen 38 in a manner that can be used with an analog video signal. In other words, pixels corresponding to privacy masks, virtual masks, or informational displays are merged with the image captured by camera 22 by the action of switches 68*a* and 68*b*.

As described above, a character map is stored in memory 98 and may be used in the generation of the informational displays. These individual character maps each correspond to a block of pixels and describe which of the pixels in the block are the background and which of the pixels are the foreground wherein the background and foreground have different display characteristics, e.g., the foreground and background being black and white or some other pair of contrasting colors, to form the desired character. These individual character maps may then be used to control switches 68*a*, 68*b* to produce the desired block of pixels on display screen 38.

The privacy mask is rendered in individual blocks of pixels that are 4×4 pixels in size and the implementation of the privacy mask can be described generally as follows. Initially, the user defines the boundaries of the privacy mask. When the field of view of camera 22 changes, new transformed boundaries for the privacy mask that correspond to the new field of view are calculated. The privacy mask area defined by the new boundaries is then rendered, or infilled, using 4×4 pixel blocks. By using relatively small pixel blocks, i.e., 4×4 pixel blocks instead of 10×16 pixel blocks (as might be used when displaying an individual text character), to completely fill the new transformed boundaries of the privacy mask, the privacy mask will more closely conform to the actual subject matter for which privacy masking is desired as the field of view of the camera changes. The use of privacy masking together with the on-screen display of textual information is described by Henninger in a U.S. Patent Applications entitled "ON-SCREEN DISPLAY AND PRIVACY MASKING APPARATUS AND METHOD", filed on Jun. 2, 2004 and assigned Bosch Security Systems, the disclosure of which is hereby incorporated herein by reference.

This rendering of the privacy mask in 4×4 pixel blocks does not require that the privacy mask boundaries be defined in any particular manner and the mask may be rendered at this resolution regardless of the precision at which the mask is initially defined. The process of defining and transforming a privacy mask is described in greater detail below.

In the illustrated embodiment, commands may be input by a human operator at head end unit 32 and conveyed to processing device 50 via one of the various lines, e.g., lines 45, 49, providing communication between head end unit 32 and processing device 50 which also convey other serial communications between head end unit 32 and processing device 50. In the illustrated embodiment, processing device 50 is provided with a sheet metal housing and mounted proximate camera 22. Processing device 50 may also be mounted employing alternative methods and at alternative locations. Alternative hardware architecture may also be employed with processing device 50. It is also noted that by providing processing device 50 with a sheet metal housing its mounting on or near a PTZ (pan, tilt, zoom) camera is facilitated and system 20 may thereby provide a stand alone embedded platform which does not require a personal computer-based system.

The provision of a stand-alone platform as exemplified by processing device 50 also allows the present invention to be utilized with a video camera that outputs unaltered video images, i.e., a "clean" video signal that has not been modified. After being output from the camera assembly, i.e., those components of the system within camera housing 22*a*, the "clean" video may then have a privacy mask and on-screen displays applied to it by the stand-alone platform. Typically, the use of privacy masking precludes the simultaneous use of automated tracking because the application of the privacy mask to the video image, oftentimes done by a processing device located within the camera housing, obscures a portion of the video image and thereby limits the effectiveness of the video content analysis necessary to perform automated tracking. The use of a stand-alone platform to apply privacy masking and on-screen informational displays to clean video images output by a camera allows for the use of automated tracking, or other applications requiring video content analysis, without requiring the camera assembly itself to include the hardware necessary to perform all of these features. If it was desirable, however, processing device 50 could also be mounted within housing 22a of the camera assembly.

Processing device 50 can perform several functions in addition to the provision of privacy masking, virtual masking, and on-screen displays. One such function may be an automated tracking function. For example, processing device 50 may identify moving target objects in the field of view (FOV) of the camera and then generate control signals which adjust the pan, tilt and zoom settings of the camera to track the target object and maintain the target object within the FOV of the camera. An example of an automated tracking system that may be employed by system 20 is described by Sablak et al. in U.S. patent application Ser. No. 10/306,509 filed on Nov. 27, 2002 entitled "VIDEO TRACKING SYSTEM AND METHOD" the disclosure of which is hereby incorporated herein by reference.

Although a specific hardware configuration is discussed above, various modifications may be made to this configuration in carrying out the present invention. In such alternative configurations it is desirable that the update rate of masking is sufficient to prevent the unmasking of the defined mask area during movement of the camera. The method of identifying a masked area and transforming the masked area as the field of view of the camera is changed will now be described.

Figure 4:
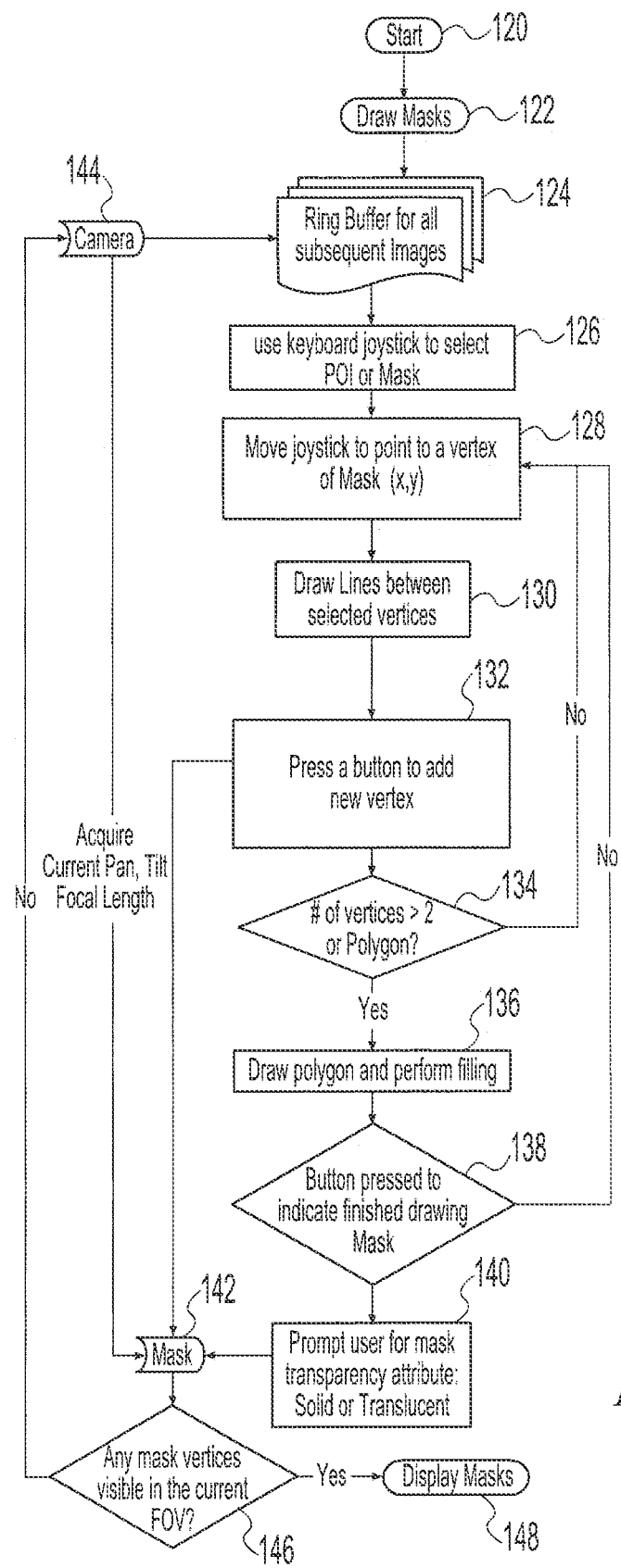
FIG. 4 is a flow chart illustrating a method by which a privacy mask may be defined.
Figure 5:
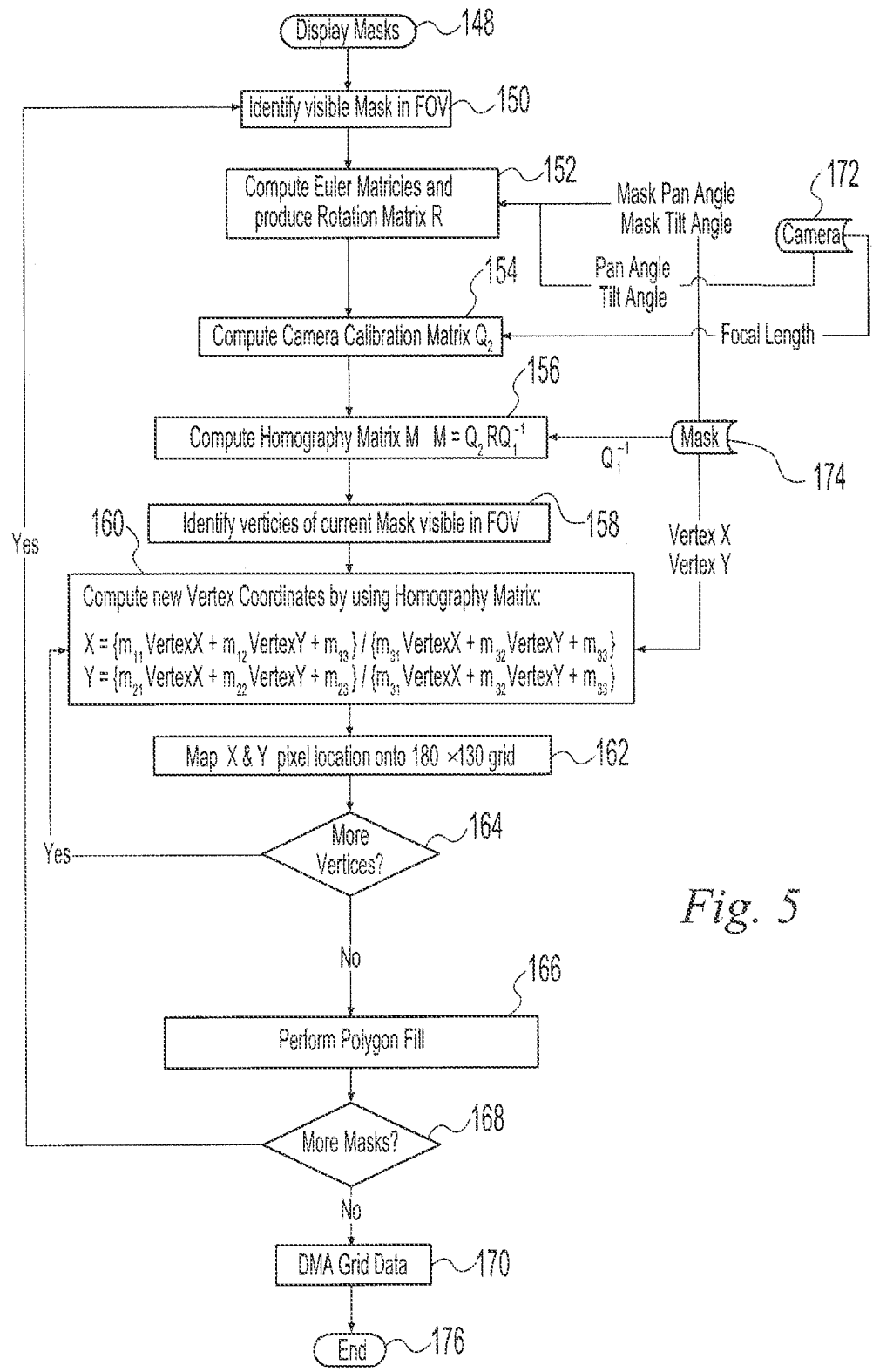
FIG. 5 is a flow chart illustrating a method by which a privacy mask may be displayed on a display screen.

FIGS. 4 and 5 present flowcharts that illustrate the method by which the software running on processing device 50 provides transformable privacy masks. FIG. 4 illustrates the algorithm by which a privacy mask is created by a user of the system. First, the user initiates the draw mask function by selecting this function from an interactive menu or by another suitable means as indicated at 120, 122. As the draw mask function is initiated, the most recently acquired images are continuously stored by the processing device as indicated at 124. The user first directs the software that a privacy mask will be drawn instead of selecting a point of interest (POI) as indicated at 126. A POI may be selected when employing a video tracking program to track the POI. The user then manipulates joystick 36 to select a mask vertex (x, y) as indicated at 128. A mouse or other suitable means may also be used to select a mask vertex. If more than one mask vertex has been selected, lines connecting the mask vertices are then drawn on the screen as indicated at 130. The user then confirms the selection of the new mask vertex by pushing a particular button or key on joystick 36 or keyboard 34 as indicated at 132. The addition of the new vertex to the mask is indicated by the line leading from box 132 to box 142. The program then determines whether the number of vertices selected for the mask is greater than two and whether or not the selected vertices define a polygon as indicated at 134. If the answer to either of these questions is "No", then the program returns to box 128 for the selection of a new mask vertex. If at least three vertices have been chosen and the selected vertices define a polygon, the program draws and fills the mask defined by the vertices as indicated at 136. The user is then asked at 138 if the mask is complete or another vertex should be added. If the user indicates that another vertex is to be added to the mask, the program returns to box 128 and the process described above is repeated. If the user has finished adding vertices to the mask and indicates that the mask is complete, the program proceeds to box 140 where the user is asked to select the type of obscuring infill to be used with the mask.

In the illustrated embodiment, the user may select either a solid infill or a translucent infill. A solid mask infill may take the form of a solid color infill, such as a homogenous gray or white infill, that obscures the video image within the mask by completely blocking that portion of the video image which corresponds to the privacy mask. A translucent infill may be formed by reducing the resolution of the video image contained within the privacy mask area to thereby obscure the video image within the privacy mask without blocking the entirety of the video image within the mask. For example, for a digital video signal, the area within the privacy mask may be broken down into blocks containing a number of individual pixels. The values of the individual pixels comprising each block are then averaged and that average value is used to color the entire block. For an analog video signal, the signal corresponding to the area within the mask may be filtered to provide a reduced resolution. These methods of reducing the resolution of a selected portion of a video image are well known to those having ordinary skill in the art.

These methods of obscuring the image may be desirable in some situations where it is preferable to reduce the resolution of the video image within the privacy mask without entirely blocking that portion of the image. For example, if there is a window for which privacy mask is desired and there is also a walkway in front of that window for which surveillance is desired, by using a translucent privacy mask, the details of the image corresponding to the window may be sufficiently obscured by the reduction in resolution to provide the desired privacy while still allowing security personnel to follow the general path of movement of a target object or individual that moves or walks in front of the window.

After selecting the type of infill for the mask, the program records this data together with the mask vertices as indicated at box 142. When initially recording the mask vertices, the pan, tilt and zoom settings of the camera are also recorded with the vertex coordinates as indicated by the line extending from camera box 144 to mask box 142. After the mask has been defined, the program determines whether any of the mask vertices are in the current field of view of the camera as indicated at 146. If no mask vertices are in the current field of view, the camera continues to forward acquired images to the processing device 50 and the images are displayed on display screen 38 without a privacy mask. If there are privacy mask vertices contained within the current field of view of the camera, the program proceeds to display the mask on display screen 38 as indicated by box 148.

FIG. 5 provides a flowchart indicating the method by which privacy masks are displayed on display screen 38 during normal operation of the surveillance camera system 20. The program first determines whether there are any privacy masks that are visible in the current field of view of the camera as indicated at 150. This may be done by using the current pan, tilt and zoom settings of the camera to determine the scope of the current field of view and comparing current field of view with the vertices of the privacy masks that have been defined by the user.

If there is a mask present in the current field of view, the program proceeds to box 152 wherein it obtains the mask data and the current pan and tilt position of the camera. The mask data includes the pan and tilt settings of the camera corresponding to the original mask vertices. The Euler angles and a Rotation matrix are then computed as described below. (As is well known to those having ordinary skill in the art, Euler's rotation theorem posits that any rotation can be described with three angles.) The focal length, or zoom, setting of the camera is then used in the computation of the camera calibration matrix $Q_2$ as indicated at 154. Homography matrix M is then computed as indicated at 156.

The calculation of the Rotational and homography matrices is used to transform the privacy mask to align it with the current image and may require the translation, scaling and rotation of the mask. Transformation of the mask for an image acquired at a different focal length than the focal length at which the mask was defined requires scaling and rotation of the mask as well as translation of the mask to properly position the mask in the current image. Masks produced by such geometric operations are approximations of the original. The mapping of the original, or reference, mask onto the current image is defined by:

$$p'=sQRQ^{-1}p=Mp \quad (1)$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the mask projection coordinates p and p', i.e., pixel locations (x, y) and (x', y'), of a stationary world point in two consecutive images may be written as:

$$x' = \frac{m_{11}x + m_{12}y + m_{13}}{m_{31}x + m_{32}y + m_{33}} \quad (2)$$

$$y' = \frac{m_{21}x + m_{22}y + m_{23}}{m_{31}x + m_{32}y + m_{33}} \quad (3)$$

Where $\lfloor m_{ij} \rfloor_{3\times 3}$ is the homography matrix M that maps (aligns) the first set of coordinates to the second set of coordinates.

The main task in such image/coordinate alignment is to determine the matrix M. From equation (1), it is clear that given s, Q and R it is theoretically straightforward to determine matrix M. In practice, however, the exact values of s, Q and R are often not known. Equation (1) also assumes that the camera center and the center of rotation are identical, which is typically only approximately true. However, this assumption may be sufficiently accurate for purposes of providing privacy masking. In the illustrated embodiment, camera 172 provides data, i.e., pan and tilt values for determining R and zoom values for determining s, on an image synchronized basis and with each image it communicates to processing device 50.

With this image-specific data, the translation, rotation, and scaling of the privacy mask to properly align it for use with a second image can then be performed using the homographic method outlined above. In this method, a translation is a pixel motion in the x or y direction by some number of pixels. Positive translations are in the direction of increasing row or column index: negative ones are the opposite. A translation in the positive direction adds rows or columns to the top or left of the image until the required increase has been achieved. Image rotation is performed relative to an origin, defined to be at the center of the motion and specified as an angle. Scaling an image means making it bigger or smaller by a specified factor. The following approximations may be used to represent such translation, rotation and scaling:

$$x'=s(x \cos \alpha - y \sin \alpha)+t_x$$

$$y'=s(y \sin \alpha + x \cos \alpha)+t_y \quad (4)$$

wherein
s is the scaling (zooming) factor.
$\alpha$ is the angle of rotation about the origin;
$t_x$ is the translation in the x direction; and
$t_y$ is the translation in the y direction.
By introducing new independent variables $a_1 = s \cos \alpha$ and $a_2 = s \sin \alpha$, equation (4) becomes:

$$x'=a_1 x - a_2 y + t_x$$

$$y'=a_2 x + a_1 y + t_y \quad (5)$$

After determining $a_1$, $a_2$, $t_x$ and $t_y$, the coordinates of the reference mask vertices can be transformed for use with the current image.

The value of $Q_1^{-1}$ corresponding to the mask being transformed is obtained from a storage device as indicated by the line extending from box 174 to box 156. E.g., this mask data may be stored in mask memory. As described above, when the mask is to be applied to a digital video image, the data will be stored in mask memory 102, and when the mask is to be applied to an analog video signal the data will be stored in mask memory 96. After computation of the homography matrix M, the vertices of the current mask visible in the field of view are identified, as indicated at 158, and then the homography matrix is used to determine the transformed image coordinates of the mask vertices as indicated at 160. The new image coordinates are then mapped onto a 180×360 grid as indicated at 162 and stored in the appropriate mask memory 96 or 102.

After mapping the mask vertex, the program determines if there are any remaining mask vertices that require transformation as indicated at 164. If there are additional mask vertices, the program returns to box 160 where the homography matrix M is used to determine the transformed image coordinates of the additional mask vertex. This process is repeated until transformed image coordinates have been computed for all of the mask vertices. The process then proceeds to box 166 and the polygon defined by the transformed image coordinates is infilled.

The program then determines if there are any additional privacy masks contained in the current field of view as indicated at 168. If there are additional masks, the program returns to box 150 where the additional mask is identified and the process described above is repeated for this additional mask. Once all of the masks have been identified, transformed and infilled, the program proceeds to box 170 where the mask data stored in mask memory, 96 or 102, is retrieved using DMA (direct memory access) techniques for application to the video image signal. The displaying of the privacy masks for the current field of view is then complete as exemplified by box 176.

So long as the field of view of the camera is not changed, the image coordinates of the privacy masks remain constant. If the mask infill is a solid infill, the solid infill remains unchanged until the field of view of the camera changes. If the mask infill is a translucent infill, the relatively large pixel blocks infilling the mask will be updated with each new image acquired by the camera but the location of the pixel blocks forming the privacy mask will remain unchanged until the field of view of the camera is changed. Once the field of view of the camera is changed, by altering one or more of the pan angle, tilt angle or zoom setting (i.e., focal length) of the camera, the display mask algorithm illustrated in FIG. 4 is repeated to determine if any privacy masks are contained in the new field of view and to transform the image coordinates of any masks contained within the field of view so that the masks can be displayed on display screen 38.

Figure 6:
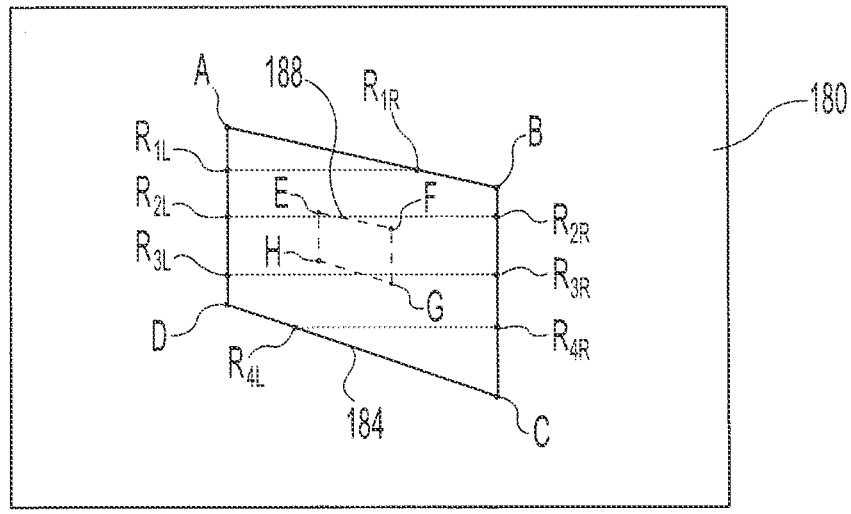
FIG. 6 is a schematic view of a privacy mask.
Figure 7:
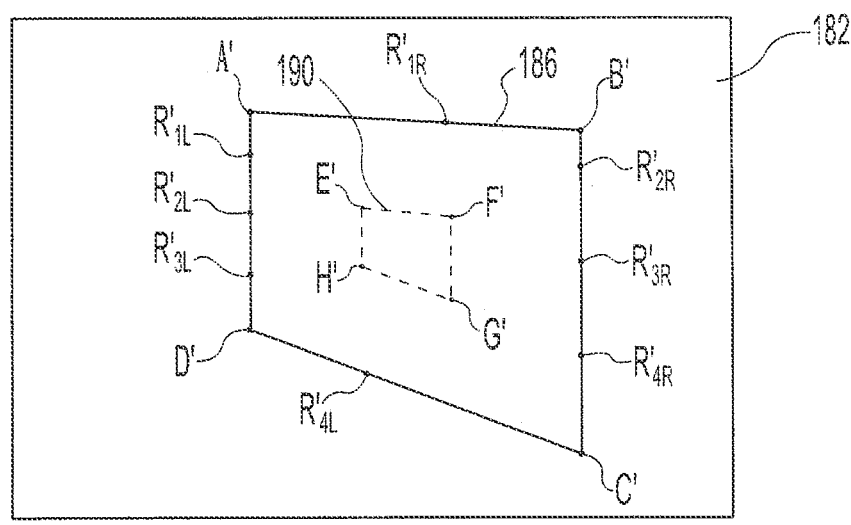
FIG. 7 is a schematic view of the privacy mask of FIG. 6 after the mask has been transformed to account for a change in the field of view of the camera.

The definition of the privacy mask vertices may be done in alternative manners as described below with reference to FIGS. 6-9. For example, the original definition of the privacy mask involves the user selecting a number of particular points, e.g., points A, B, C and D in FIG. 6, with the camera defining a first field of view to define a polygon that corresponds to the boundary of the privacy mask. With reference to FIGS. 6 and 7, FIG. 6 shows the image 180 that is displayed on screen 38 when camera 22 defines a first field of view while FIG. 7 shows the image 182 that is displayed on screen 38 after slightly adjusting the field of view of the camera to define a second field of view. Line 184 defines the outer boundary of the privacy mask in image 180 while line 186 defines the outer boundary of the transformed privacy mask in image 182.

The vertices used to define the privacy mask may be limited to the user input vertices, i.e., points A, B, C and D for the mask of FIGS. 6 and 7, or, after the user has defined the boundaries of the mask by inputting vertices, additional points along the boundary of the mask may be automatically selected to define further vertices of the mask. For example, the mask defined by the user can be broken down into the individual rows of pixels defining the mask and the pixel at the left and right ends of each row included in the original mask may be selected as additional mask vertices. Alternatively, instead of selecting additional vertices for each row, additional vertices may be selected for every second row or for every third row, etc. In FIG. 6, only a few additional vertices are labeled for illustrative purposes. (FIG. 6 is not drawn to scale and vertices have not been drawn for all the pixel rows forming the mask.) More specifically, vertices $R_{1L}$, $R_{1R}$ respectively correspond to the left and right end points of the first row of pixels in the mask, while vertices $R_{2L}$, $R_{2R}$ respectively correspond to the left and right end points of the second row of pixels in the mask, the remaining vertices are labeled using this same nomenclature.

After adjusting the field of view of the camera to second field of view as depicted in FIG. 7, the coordinates of the mask vertices are transformed and the transformed coordinates are used to define vertices which, when connected, define the boundary 186 of the transformed mask for display on screen 38. If only the user defined points are used to define the mask vertices, the transformed mask will be drawn by connecting vertices A, B, C and D. However, if additional vertices, e.g., $R_{1L}$, $R_{1R}$ ... $R_{4L}$, $R_{4R}$ etc., are used to define the mask, then transformed coordinates will be calculated for each of these vertices and the transformed mask will be drawn by connecting each of the transformed vertices. After defining the boundaries of the mask, the mask is then infilled. By providing a larger number of vertices, the mask will more closely follow the contours of the subject matter obscured by the originally defined privacy mask as the field of view changes. The degree to which the mask conforms to the contours of the subject matter for which masking is desired is also influenced by the manner in which the boundaries of the mask are infilled. For example, infilling the privacy mask on an individual pixel basis, the displayed mask will most closely correspond to the calculated boundaries of the privacy mask. The mask may also be infilled in small blocks of pixels, for example, individual blocks having a size of 4×4 pixels may be used to infill the mask, because these individual blocks of pixels are larger than a single pixel, the resulting display will not as closely correspond to calculated boundaries of the privacy mask as when the mask is infilled on an individual pixel basis but will still provide a relatively precisely rendered privacy mask.

The present invention may also be used to allow for an interior area within a mask that is not obscured. For example, the area defined by vertices E, F, G and H in FIG. 6 is an unmasked area, i.e., this portion of the video image is not obscured, that is completely encircled by a masked area. This unmasked area would be defined by the user when originally inputting the mask. For example, the software could inquire whether the user wanted to create an interior unmasked area prior when the mask is being defined. The vertices defining the unmasked interior portion, i.e., the interior boundary 188 of the mask, would be transformed, with transformed vertices E', F', G' and H' defining a transformed inner boundary 190, in the same manner as the outer boundary of the mask is transformed. Additional vertices, for each pixel row, could also be defined by for this interior boundary in the same manner as the outer mask boundary.

Figure 8:
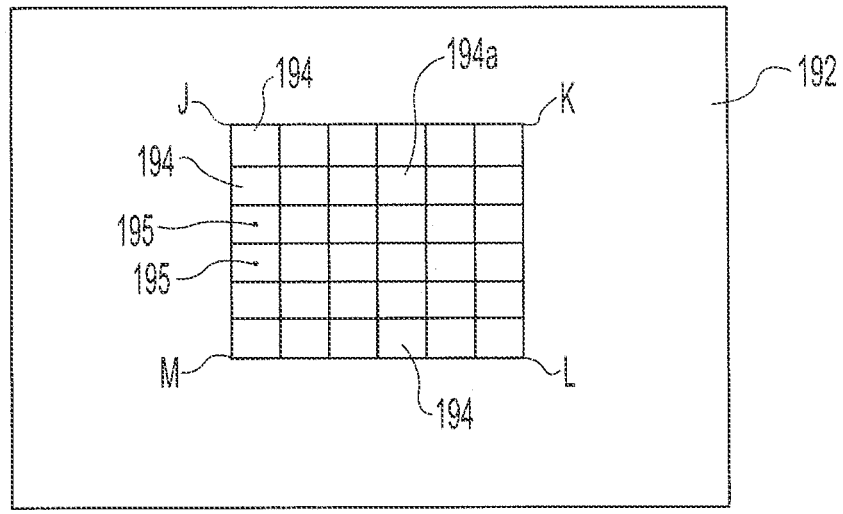
FIG. 8 is a schematic view of another privacy mask.
Figure 9:
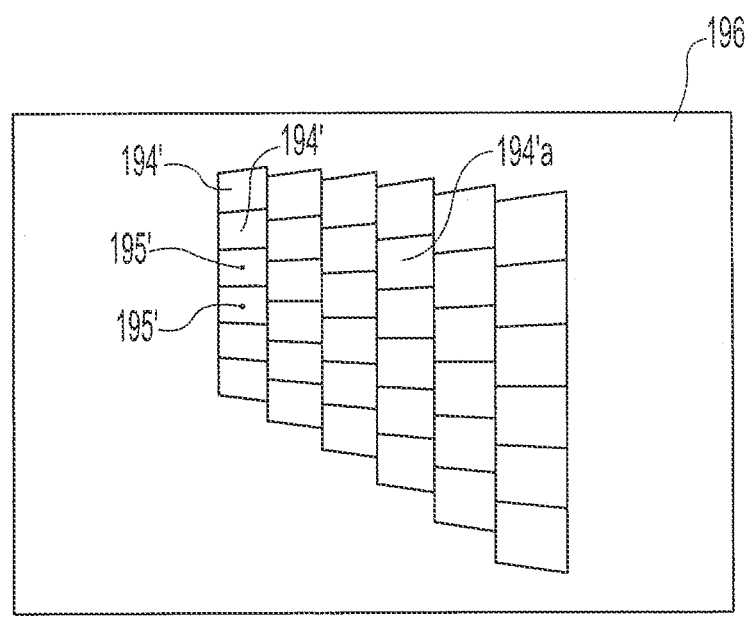
FIG. 9 is a schematic view of the privacy mask of FIG. 8 after the mask has been transformed to account for a change in the field of view of the camera.

An alternative method of defining the mask vertices is illustrated in FIGS. 8 and 9. In this embodiment of the invention, the user inputs a series of points to define the original mask, e.g., points J, K, L and M in image 192 of FIG. 8. The masked area is then broken down into individual blocks of pixels 194 having a common size. These individual mask blocks may any number of pixels, e.g., blocks of nine or four pixels. Blocks 194 may also consist of only a single pixel. The smaller the number of pixels in each block, the more closely the transformed mask will correspond to the actual subject matter obscured by the original mask. As can be seen in FIG. 8 some of the mask blocks, e.g., block 194*a*, may be non-perimeter pixel blocks that are entirely circumscribed by other blocks that form a portion of the mask. As each of the individual blocks are defined, a mask vertex 195 is assigned to each block. The coordinates of each vertex may correspond to the center of the block, as shown in FIG. 8, or another common location, e.g., the upper left hand corner of each block. When the field of view of the camera is changed, e.g., to the second field of view defining image 196 shown in FIG. 9, transformed coordinates are calculated for each of the individual vertices 195 defining the locations of the mask blocks 194. A transformed size for each of the mask blocks is also calculated. Thus, mask blocks that were the same size in the field of view when the mask was originally defined may have different sizes when the field of view of the camera is changed. The transformed coordinates and size of each mask block forming the mask is calculated and used to define the transformed mask as exemplified in FIG. 9. The boundaries defined by the transformed mask are then used to determine the area of the image that requires infilling to produce the desired obscuration. It would also be possible for the mask blocks 194 to completely encircle an unmasked area within the interior of the mask.

As mentioned above, processing device 50 also runs software which enables a user to identify private areas, such as the window of a nearby residence for masking. The privacy mask is then used to obscure the underlying subject matter depicted in the image. For cameras having an adjustable field of view, the masked area must be transformed as the field of view of the camera is changed if the mask is to continue to provide privacy for the same subject matter, e.g., a window of a nearby residence, as the field of view of the camera is changed. Although such privacy masks typically involve the obscuration of the displayed image within the area of the mask, it may alternatively be desirable to provide a virtual mask. For example, a window or other area may include a significant amount of motion that it is not desirable to track but which could activate an automated tracking program. In such a situation, it may be desirable to define a mask for such an area and continue to display the masked area at the same resolution as the rest of the image on display screen 38 but not utilize this area of the image for automated tracking purposes. In other words, for purposes of the automated tracking program, the image is "obscured" within the masked area (by reducing the information provided or available for analysis for the masked area), even though the resolution of the image displayed in this area is not reduced. The present invention may also be used with such virtual masks.

The algorithms for virtual masking may be the same as those used by the privacy masking software on the system controller CPU. Changes to the privacy masking software may be required in order to enable virtual masking functionality.

Virtual masks may differ from privacy masks in two important aspects. First, wherein privacy masks may be applied directly to input video to prevent the user from seeing what is behind the masks, virtual masks may be applied directly to the computed motion mask to inhibit the autotracker and motion detection software from having the virtually masked areas contribute to detected motion. Second, virtual masks might not be visible on the output video.

Virtual masks may be warped onto the motion mask based upon the pan, tilt, and zoom parameters of the parent image as well as pan, tilt, and zoom parameters of the masks. Real-time automated "transformable virtual masking" is an enabling technology for the reduction of static motion effects on displays including such things as flags, trees, or fans, etc.

A possible approach to masking static motion or "background motion" involves removing or deleting a large preselected area, that may possibly include static motion, from a calculated motion mask. The computer vision system may transform each mask on image frames from cameras, and may process each frame to remove static motion. Such an approach may remove a large portion of useful information in addition to removing static motion.

The virtual masking system of the present invention may use a proprietary general-purpose video processing platform that obtains video and camera control information from a standard PTZ camera. The virtual masking may be performed by proprietary software running on the video processing platform. The software may run on camera board.

The software performing the virtual masking may be run on an internal processor in the PTZ camera that allows the masking of a static motion area for a region of interest by using image processing on the source video. Initially, the virtual masking system may inquire about the current camera position in pan, tilt and zoom; select the region(s) of interest (ROI) which includes any number of polygon vertices in arbitrary shapes; lock onto the ROI; track that ROI movement within the limits of the PTZ camera's view; and then transform ROI by utilizing image and vision processing techniques. The virtual masking system must reliably maintain the location and shape transformation of the ROI, which requires the computer vision algorithms to execute at near real-time speeds.

The virtual masking system may mask the ROI on the motion mask image from the auto-tracker software in the PTZ camera using continuous motion in all directions (pan/tilt/zoom). In the meanwhile, the virtual masking system may not modify the display image, but may remove static motion in the motion mask which has been computed in auto-tracker. The techniques may include storing PTZ positions and each polygon vertex for each mask. Virtual masking may transform each mask shape by using only homogenous coordinates. This type of virtual masking may eliminate the negative effects associated with geometric distortion for PTZ cameras, leading to more accurate locations of virtual masks.

Inputs to the virtual masking algorithm may include the motion mask that is computed by autotracker. Another input may be the virtual masks themselves. Each mask may include a set of vertices. The virtual masks may be created on the system controller, and then the mask information may be received by and buffered on the video content analysis digital signal processor. More particularly, the virtual masks may be transferred from the system controller to the video content analysis digital signal processor via a host-port interface which uses semaphores to indicate a table update.

Yet another input to the virtual masking algorithm may be the camera position (pan, tilt, zoom) when the mask was created. The PTZ information may be provided to the video content analysis digital signal processor by the system controller. A further input may be scale, which may be 1.0 if stabilization is OFF, or equal to (Image_Height/Display_Height) when stabilization is ON. Still another input may be current camera position, in terms of pan, tilt, and zoom.

An output of the virtual masking algorithm may be a modified motion mask with pixel elements corresponding to areas "behind" the virtual masks set to 0. Each virtual mask may include a set of vertices, the number of vertices, and the camera position (pan, tilt, zoom) when the mask was created.

External variables of virtual masking may include camera pan, tilt, and zoom data. Another external variable may be the motion mask, e.g., either 176×120 (NTSC) or 176×144 (PAL). Internal variables of virtual masking may include a homography matrix developed by considering camera intrinsics, rotation and projection matrices.

Figure 10:
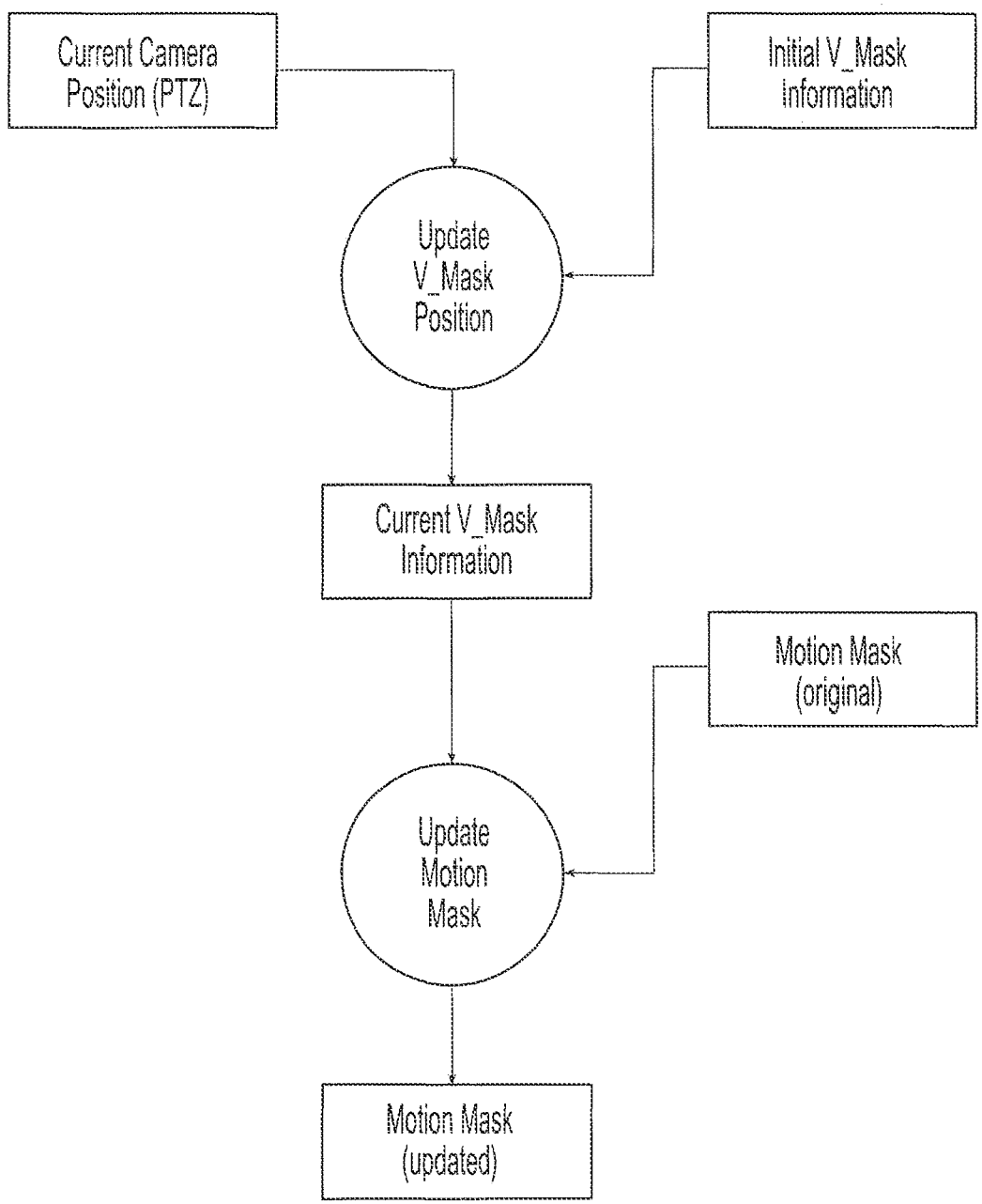
FIG. 10 is a data flow diagram of one embodiment of a method of the present invention for drawing virtual masks upon a motion mask.

FIG. 10 is a data flow diagram for the process of drawing virtual masks upon a motion mask. First the coordinates of a virtual mask or masks are evaluated by means of the current camera PTZ information and mathematical procedures. Then the motion mask is updated with the new virtual mask information.

Figure 11:
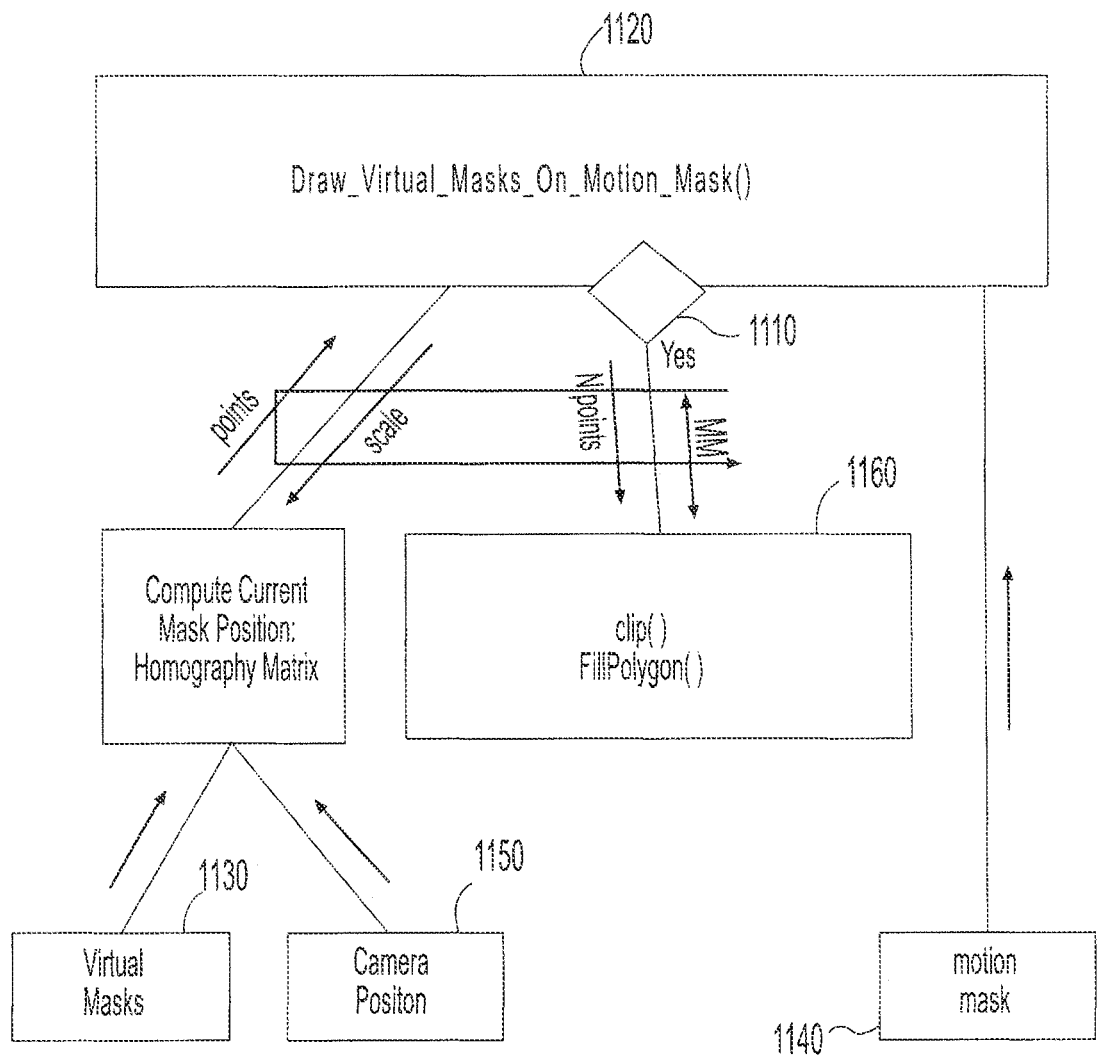
FIG. 11 is a data flow diagram of one embodiment of a virtual masking algorithm of the present invention.

FIG. 11 is a data flow diagram for one embodiment of a virtual masking algorithm of the present invention. In decision box 1110, it is determined whether a mask is currently visible. "N" represents the number of virtual masks. "MM" represents the motion mask. Warped vertices are represented by "points" (homography may be used). If stabilization is OFF, then "scale" may be equal to one. Else, "scale" may be equal to the ratio of the image height to the display height.

Draw_Virtual_Masks_On_Motion_Mask function 1120 may determine which virtual masks 1130 are currently visible, and may effect the drawing of the virtual masks on a motion mask 1140. The coordinates of a virtual mask or masks may be evaluated or determined by use of the current camera PTZ information and mathematical procedures such as homography, etc. Before drawing the polygon, vertices may be evaluated or moved by use of a clipping algorithm. The clipping algorithm may be used to clip off portions of the virtual mask that are outside the field of view. It may be taken into consideration that, when a virtual mask polygon is clipped, the clipped mask may have more vertices than the mask had originally before the clipping. For example, when a corner of a triangle is clipped off, a quadrilateral results.

After the polygon has been clipped, the polygon with its appropriate vertices may be filled.

Inputs to Draw_Virtual_Masks_On_Motion_Mask function 1120 may include a current camera position (pan, tilt, zoom) 1150, a pointer to motion mask 1140, and/or a scale value. Scaling may be needed if stabilization is ON. An output of Draw_Virtual_Masks_On_Motion_Mask function 1120 may be an updated motion mask.

For each row in motion mask 1140, FillPolygon function 1160 may compute the left and right edge pairs of all visible masks, and may fill the motion mask elements between each left/right edge pair. The filling itself may be performed by another function.

This virtual masking FillPolygon function 1160 may be adapted and modified from the privacy masking FillPolygon function. There may be no algorithmic difference between the virtual masking and privacy masking FillPolygon functions. It is possible that only the mechanism in which each line is filled will be different in the virtual masking and privacy masking FillPolygon functions. The system controller may fill each line via the FPGA. The VCA may fill each line by manipulating each pixel directly, or possibly by using a series of quick direct memory access (QDMA) transfers.

A DrawLineByZeros ( ) function may be called for every line of a mask/polygon. The DrawLineByZeros ( ) function may draw a line in the motion mask between two given points if the input pointer points to memory area of the motion mask. In the case of virtual masking the masks may be invisible, and thus the line drawing in this context may include setting those pixels to zero which are behind the virtual masks.

The DrawLineByZeros ( ) function may be in some ways similar to the privacy masking function. However, in the case of virtual masking, the line drawing may not be performed on the FPGA, but rather may be directly performed on the memory, such as RAM. That is, pixels stored in the memory area of the motion mask may be modified (set to 0) directly. The virtual masking approach may include a number of separate algorithmic functions which are presented in the flow charts of FIGS. 12 and 13.

Figure 12:
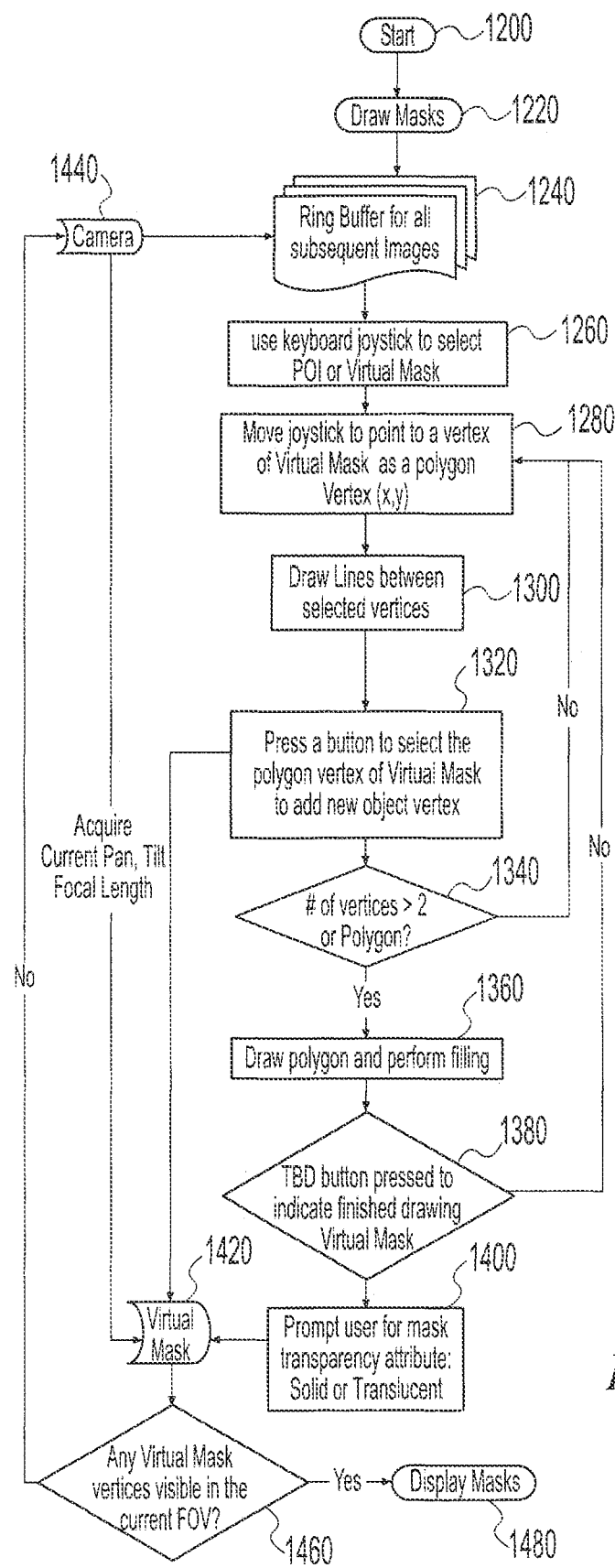
FIG. 12 is a flow chart illustrating a method by which a virtual mask may be defined.

FIGS. 12 and 13 present flowcharts that illustrate the method by which the software running on processing device 50 provides transformable virtual masks. FIG. 12 illustrates the algorithm by which a virtual mask is drawn or created by a user of the system. First, the user initiates the draw mask function by selecting this function from an interactive menu or by another suitable means, as indicated at 1200, 1220. As the draw mask function is initiated, the most recently acquired images are continuously stored by the processing device, as indicated at 1240. The user first directs the software that a virtual mask will be drawn instead of selecting a point of interest (POI), as indicated at 1260. A POI may be selected when employing a video tracking program to track the POI. The user then manipulates joystick 36 to select a mask vertex (x, y), as indicated at 1280. A mouse or other suitable means may also be used to select a mask vertex. If more than one mask vertex has been selected, lines connecting the mask vertices are then drawn on the screen, as indicated at 1300. The user then confirms the selection of the new mask vertex by pushing a particular button or key on joystick 36 or keyboard 34, as indicated at 1320. The addition of the new vertex to the mask is indicated by the line leading from box 1320 to box 1420. The program then determines whether the number of vertices selected for the mask is greater than two and whether or not the selected vertices define a polygon, as indicated at 1340. If the answer to either of these questions is "No", the program returns to box 1280 for the selection of a new mask vertex. If at least three vertices have been chosen and the selected vertices define a polygon, the program draws and fills the mask defined by the vertices, as indicated at 1360. The user is then asked at 1380 whether the mask is complete or another vertex should be added. If the user indicates that another vertex is to be added to the mask, the program returns to box 1280 and the process described above is repeated. If the user has finished adding vertices to the mask and indicates that the mask is complete, the program proceeds to box 1400 where the user is asked to select the type of obscuring infill to be used with the mask.

In the illustrated embodiment, the user may select either a solid infill or a translucent infill. A solid mask infill may take the form of a solid color infill, such as a homogenous gray or white infill, that obscures the video image within the mask by completely blocking that portion of the video image which corresponds to the virtual mask. A translucent infill may be formed by reducing the resolution of the video image contained within the virtual mask area to thereby obscure the video image within the virtual mask without blocking the entirety of the video image within the mask. For example, for a digital video signal, the area within the virtual mask may be broken down into blocks containing a number of individual pixels. The values of the individual pixels comprising each block are then averaged and that average value is used to color the entire block. For an analog video signal, the signal corresponding to the area within the mask may be filtered to provide a reduced resolution. These methods of reducing the resolution of a selected portion of a video image are well known to those having ordinary skill in the art.

These methods of obscuring the image may be desirable in some situations where it is preferable to reduce the resolution of the video image within the virtual mask without entirely blocking that portion of the image. For example, if there is a window for which virtual mask is desired and there is also a walkway in front of that window for which surveillance is desired, by using a translucent virtual mask, the details of the image corresponding to the window may be sufficiently obscured by the reduction in resolution to indicate the location of the virtual mask while still allowing security personnel to follow the general path of movement of a target object or individual that moves or walks in front of the window.

After selecting the type of infill for the mask, the program records this data together with the mask vertices as indicated at box 1420. When initially recording the mask vertices, the pan, tilt and zoom settings of the camera are also recorded with the vertex coordinates as indicated by the line extending from camera box 1440 to mask box 1420. After the mask has been defined, the program determines whether any of the mask vertices are in the current field of view of the camera as indicated at 1460. If no mask vertices are in the current field of view, the camera continues to forward acquired images to the processing device 50 and the images are displayed on display screen 38 without a virtual mask. If there are virtual mask vertices contained within the current field of view of the camera, the program proceeds to display the mask on display screen 38 as indicated by box 1480.

Figure 13A:
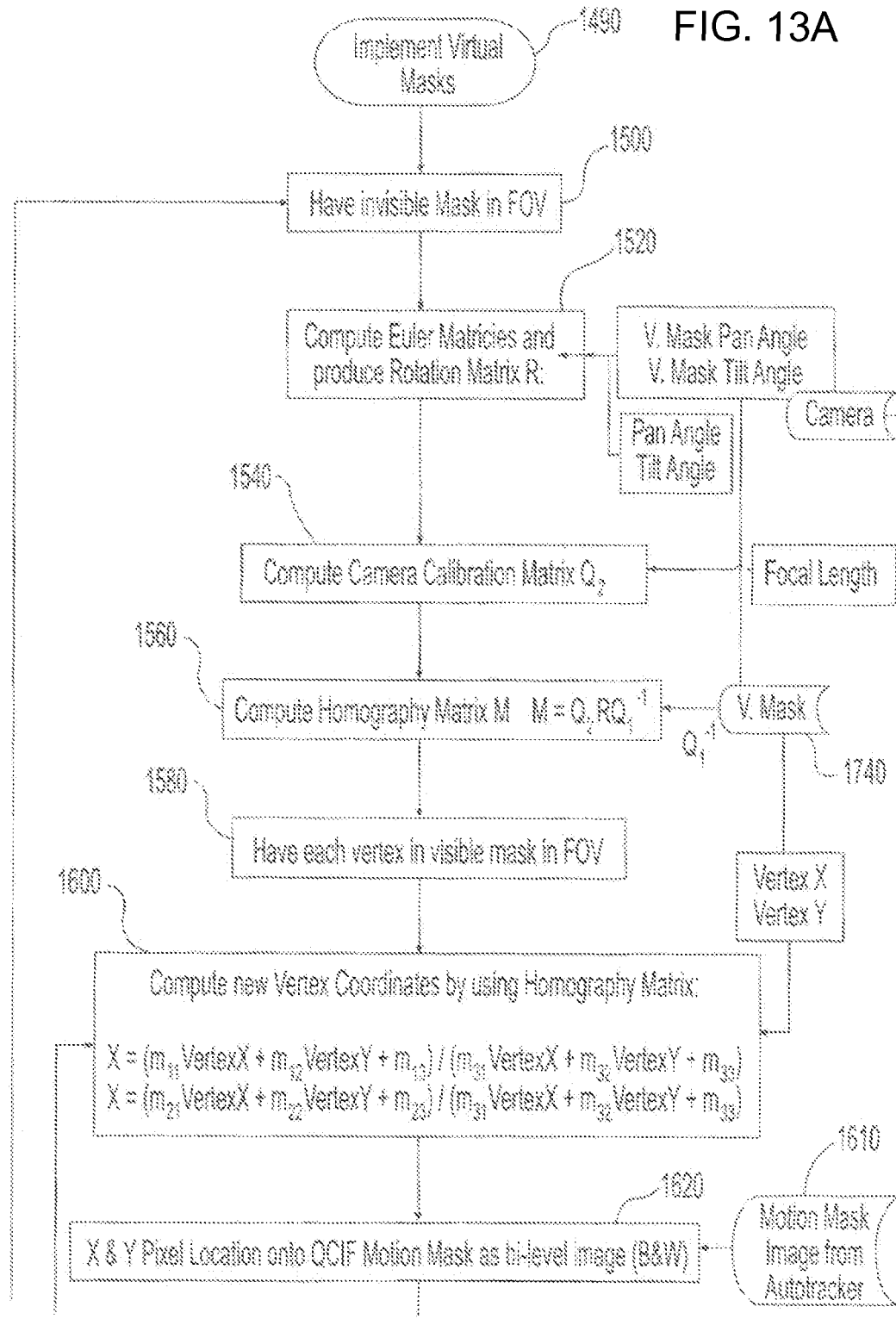
FIGS. 13A and 13B are a flow chart illustrating a method by which a virtual mask may be used in autotracking.
Figure 13B:
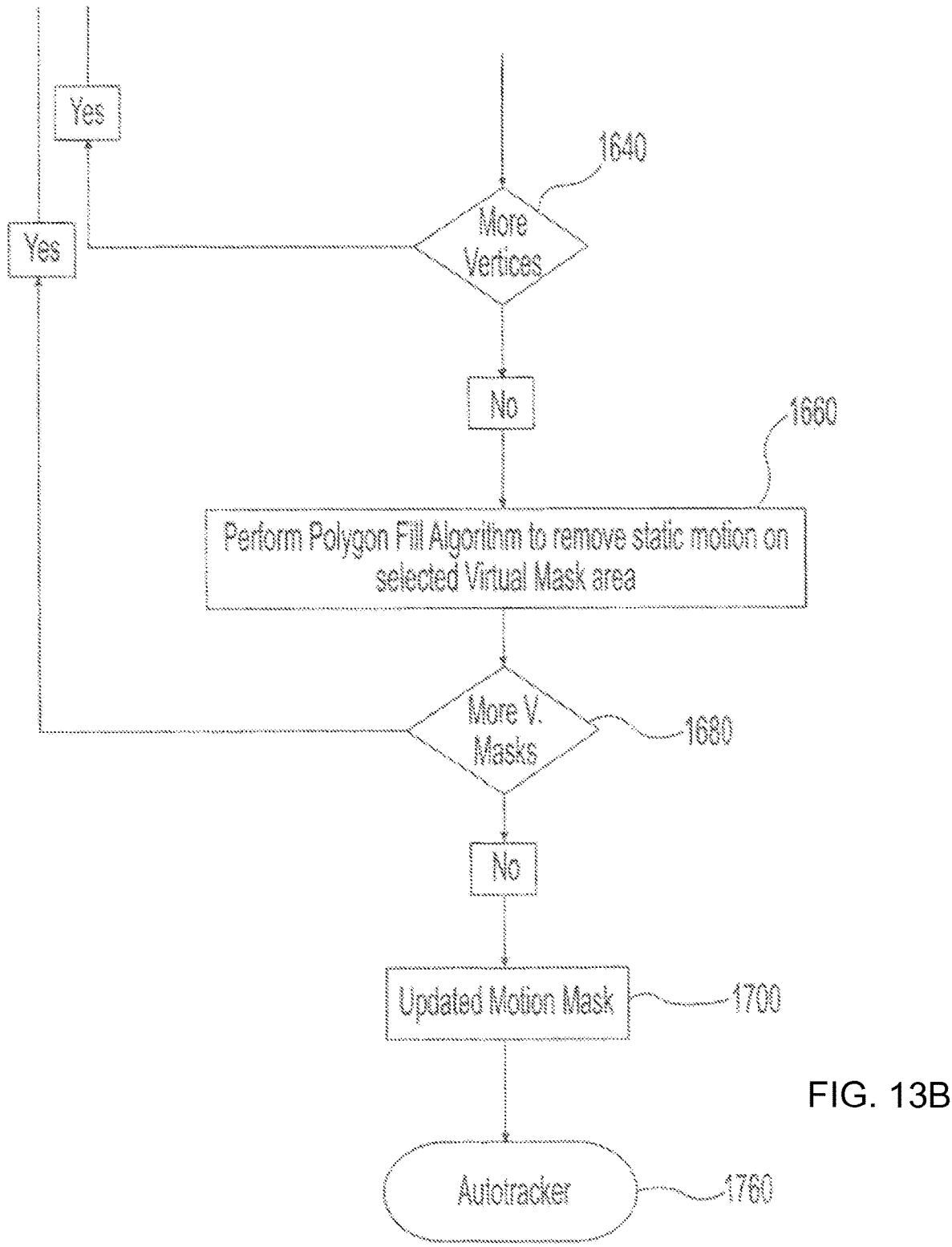

FIGS. 13A and 13B provide a flowchart indicating the method by which virtual masks are implemented during normal operation of the surveillance camera system 20. First, the user initiates the implement virtual mask function by selecting this function from an interactive menu or by another suitable means as indicated at 1490. Next, the program determines whether there are any virtual masks that are in the current field of view of the camera as indicated at 1500. This may be done by using the current pan, tilt and zoom settings of the camera to determine the scope of the current field of view and comparing the current field of view with the vertices of the virtual masks that have been defined by the user. It is to be understood that, after having been drawn by the user, the virtual mask may be invisible even though it is located within the field of view.

If there is a mask present in the current field of view, the program proceeds to box 1520 wherein it obtains the mask data and the current pan and tilt position of the camera. The mask data includes the pan and tilt settings of the camera corresponding to the original mask vertices. The Euler angles and a Rotation matrix are then computed as described below. (As is well known to those having ordinary skill in the art, Euler's rotation theorem posits that any rotation can be described with three angles.) The focal length, or zoom, setting of the camera is then used in the computation of the camera calibration matrix $Q_2$ as indicated at 1540. Homography matrix M is then computed as indicated at 1560.

The calculation of the Rotational and homography matrices is used to transform the virtual mask to align it with the current image and may require the translation, scaling and rotation of the mask. Transformation of the mask for an image acquired at a different focal length than the focal length at which the mask was defined requires scaling and rotation of the mask as well as translation of the mask to properly position the mask in the current image. Masks produced by such geometric operations are approximations of the original. The mapping of the original, or reference, mask onto the current image is defined by:

$$p' = sQRQ^{-1}p = Mp \quad (1)$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the mask projection coordinates p and p', i.e., pixel locations (x,y) and (x', y'), of a stationary world point in two consecutive images may be written as:

$$x' = \frac{m_{11}x + m_{12}y + m_{13}}{m_{31}x + m_{32}y + m_{33}} \quad (2)$$

$$y' = \frac{m_{21}x + m_{22}y + m_{23}}{m_{31}x + m_{32}y + m_{33}} \quad (3)$$

Where $\lfloor m_{ij} \rfloor_{3\times 3}$ is the homography matrix M that maps (aligns) the first set of coordinates to the second set of coordinates.

The main task in such image/coordinate alignment is to determine the matrix M. From equation (1), it is clear that given s, Q and R it is theoretically straightforward to determine matrix M. In practice, however, the exact values of s, Q and R are often not known. Equation (1) also assumes that the camera center and the center of rotation are identical, which is typically only approximately true. However, this assumption may be sufficiently accurate for purposes of providing virtual masking. In the illustrated embodiment, camera 1720 provides data, i.e., pan and tilt values for determining R and zoom values for determining s, on an image synchronized basis and with each image it communicates to processing device 50.

With this image-specific data, the translation, rotation, and scaling of the virtual mask to properly align it for use with a second image can then be performed using the homographic method outlined above. In this method, a translation is a pixel motion in the x or y direction by some number of pixels. Positive translations are in the direction of increasing row or column index: negative ones are the opposite. A translation in the positive direction adds rows or columns to the top or left of the image until the required increase has been achieved. Image rotation is performed relative to an origin, defined to be at the center of the motion and specified as an angle. Scaling an image means making it bigger or smaller by a specified factor. The following approximations may be used to represent such translation, rotation and scaling:

$$x' = s(x \cos \alpha - y \sin \alpha) + t_x$$

$$y' = s(y \sin \alpha + x \cos \alpha) + t_y \quad (4)$$

wherein
s is the scaling (zooming) factor.
$\alpha$ is the angle of rotation about the origin;
$t_x$ is the translation in the x direction; and
$t_y$ is the translation in the y direction.
By introducing new independent variables $a_1 = s \cos \alpha$ and $a_2 = s \sin \alpha$, equation (4) becomes:

$$x' = a_1 x - a_2 y + t_x$$

$$y' = a_2 x + a_1 y + t_y \quad (5)$$

After determining $a_1$, $a_2$, $t_x$ and $t_y$, the coordinates of the reference mask vertices can be transformed for use with the current image.

The value of $Q_1^{-1}$ corresponding to the mask being transformed is obtained from a storage device as indicated by the line extending from box 1740 to box 1560. E.g., this mask data may be stored in mask memory. As described above, when the mask is to be applied to a digital video image, the data will be stored in mask memory 102 and when the mask is to be applied to an analog video signal the data will be stored in mask memory 96. After computation of the homography matrix M, the vertices of the current mask visible in the field of view are identified, as indicated at 1580, and then the homography matrix is used to determine the transformed image coordinates of the mask vertices as indicated at 1600. The new image coordinates are then mapped onto a motion mask image 1610 from autotracker as a bi-level image, such as a black and white image, as indicated at 1620. The motion mask may be in the form of a Quarter Common Intermediate Format (QCIF) motion mask. The new image coordinates may be stored in the appropriate mask memory 96 or 102.

After mapping the mask vertex, the program determines if there are any remaining mask vertices that require transformation as indicated at 1640. If there are additional mask vertices, the program returns to box 1600 where the homography matrix M is used to determine the transformed image coordinates of the additional mask vertex. This process is repeated until transformed image coordinates have been computed for all of the mask vertices. The process then proceeds to box 1660 and the polygon defined by the transformed image coordinates is infilled to remove static motion on the selected virtual mask area. For example, each pixel of the motion mask that is within the virtual mask may be assigned a value of "0".

The program then determines if there are any additional virtual masks contained in the current field of view as indicated at 1680. If there are additional masks, the program returns to box 1500 where the additional mask is identified and the process described above is repeated for this additional mask. Once all of the virtual masks have been identified, transformed and infilled, the program proceeds to box 1700 where the mask data stored in mask memory, 96 or 102, is retrieved using DMA (direct memory access) techniques for application to and updating of the motion mask. The updated motion mask as modified by one or more virtual masks is then sent to the autotracker algorithm as exemplified by box 1760. The autotracker algorithm may then use the updated motion mask to track moving objects of interest that are in the field of view without interference from sources of static motion that are within the field of view.

So long as the field of view of the camera is not changed, the image coordinates of the virtual masks remain constant. If the mask infill is a solid infill, the solid infill remains unchanged until the field of view of the camera changes. If the mask infill is a translucent infill, the relatively large pixel blocks infilling the mask will be updated with each new image acquired by the camera but the location of the pixel blocks forming the privacy mask will remain unchanged until the field of view of the camera is changed. Once the field of view of the camera is changed, by altering one or more of the pan angle, tilt angle or zoom setting (i.e., focal length) of the camera, the display mask algorithm illustrated in FIG. 12 is repeated to determine if any virtual masks are contained in the new field of view and to transform the image coordinates of any masks contained within the field of view so that the masks can be displayed on display screen 38.

The virtual mask vertices may be defined in alternative manners which are substantially similar to those described above for privacy masks with reference to FIGS. 6-9. Thus, in order to avoid needless repetition, the alternative manners of defining virtual mask vertices will not be described in detail herein.

Figure 14:
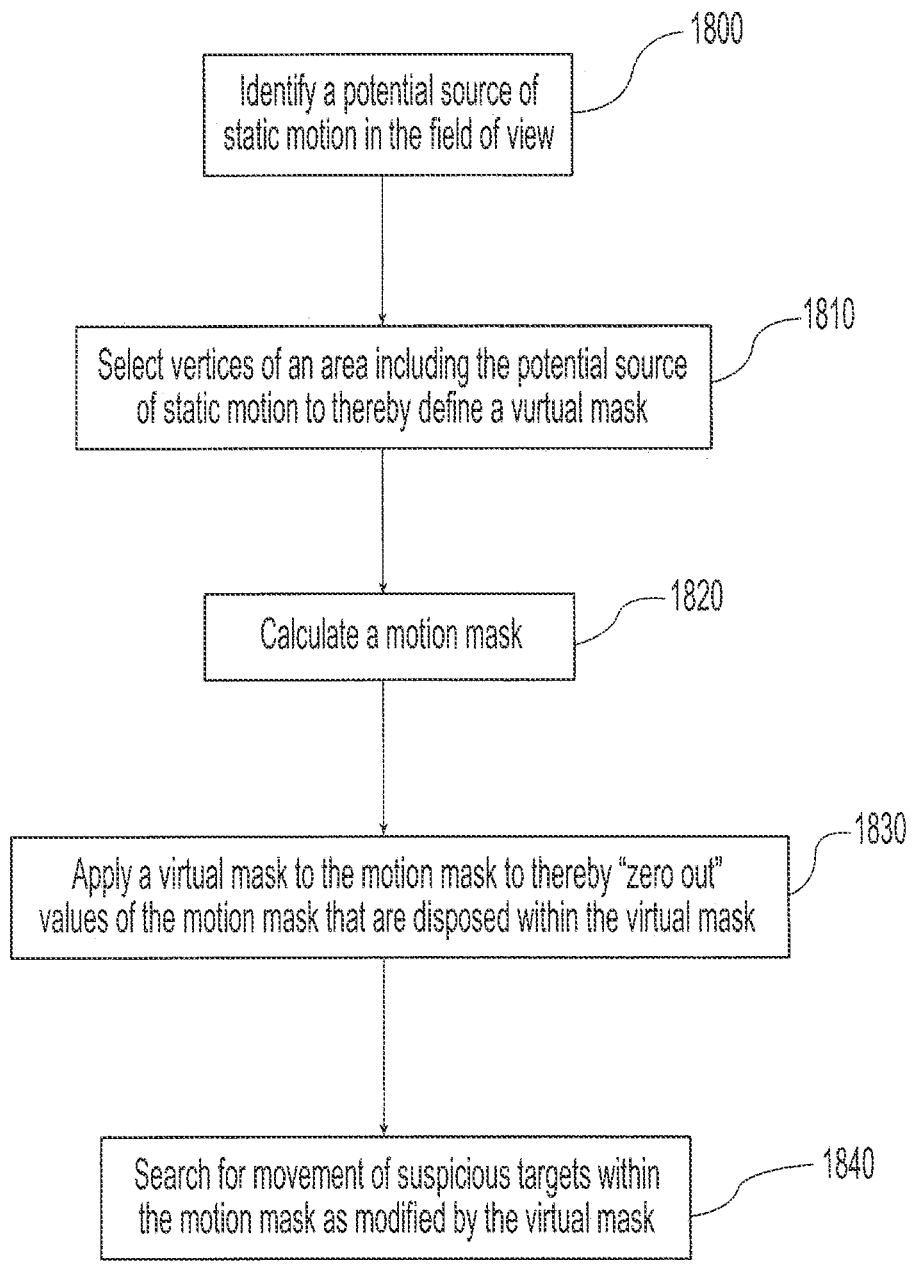
FIG. 14 is a flow chart illustrating another method by which a virtual mask may be used in autotracking.

FIG. 14 is a flow chart of another embodiment of a method of the present invention for implementing a virtual mask in an autotracking algorithm. In a first step 1800, a potential source of static motion in the field of view is identified. For example, a user may visually identify in the field of view a potential source of static motion in the form of a flag waving in the wind. In a next step 1810, vertices of an area including the potential source of static motion are selected to thereby define a virtual mask. For example, the user may use a computer mouse to click on and thereby select on display screen 38 several vertices surrounding the potential source of static motion. That is, the potential source of static motion may be disposed within a polygon defined by the selected vertices. A motion mask is calculated in step 1820. For example, the motion mask algorithm may analyze several video frames in sequence to thereby determine in which pixels there is a moving object. The algorithm may assign a motion value to each pixel to indicate the degree of motion within that pixel. Alternatively, the motion values may indicate a probability of motion being present in each pixel. In step 1830 a virtual mask is applied to the motion mask to thereby "zero out" values of the motion mask that are disposed within the virtual mask. That is, the motion values of all pixels within the virtual mask may be set to zero to thereby indicate an absence of motion within those pixels. More generally, the motion mask may be modified such that the effects of static motion on the motion mask are reduced or eliminated. In a final step 1840, the algorithm searches for movement of suspicious targets within the motion mask as modified by the virtual mask. That is, the algorithm may analyze the motion values within the motion mask and attempt to identify patterns of motion values that may indicate the existence of a moving object within the field of view. Because motion values attributable to static motion may have been zeroed out by the virtual mask, it is less likely that the identified motion is due to static motion.

Figure 15:
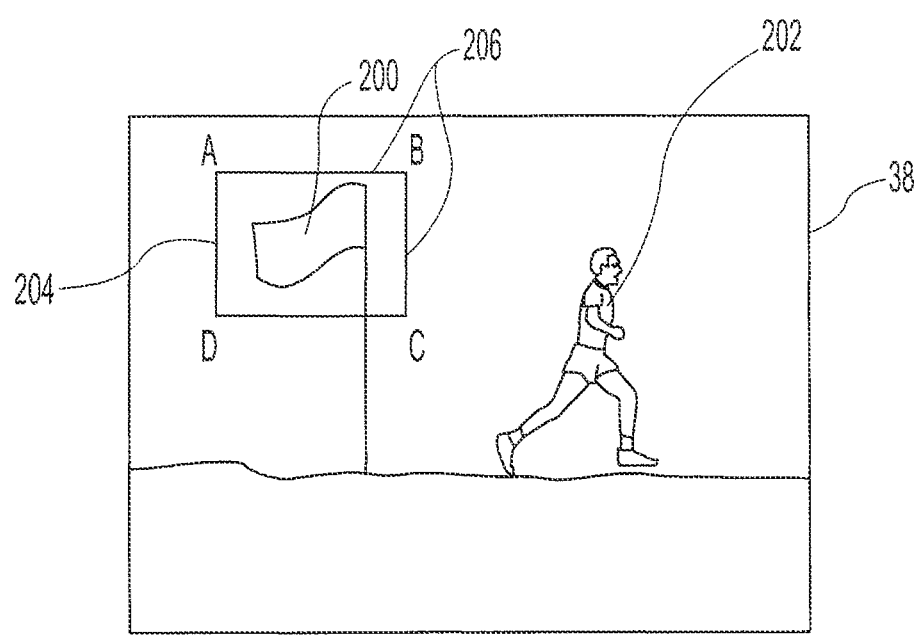
FIG. 15 is a plan view of an image acquired by the camera and displayed on a screen.
Figure 16:
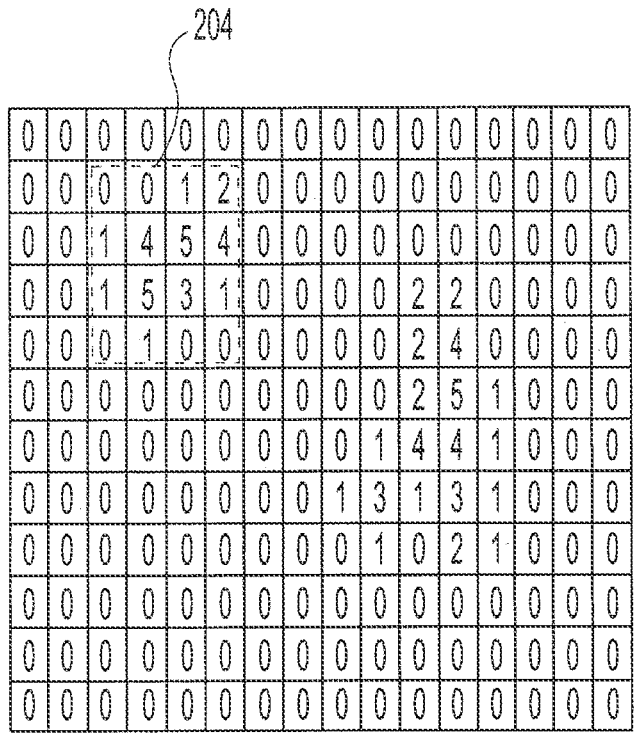
FIG. 16 is a plan view of a motion mask derived from a sequential series of images acquired by the camera.
Figure 17:
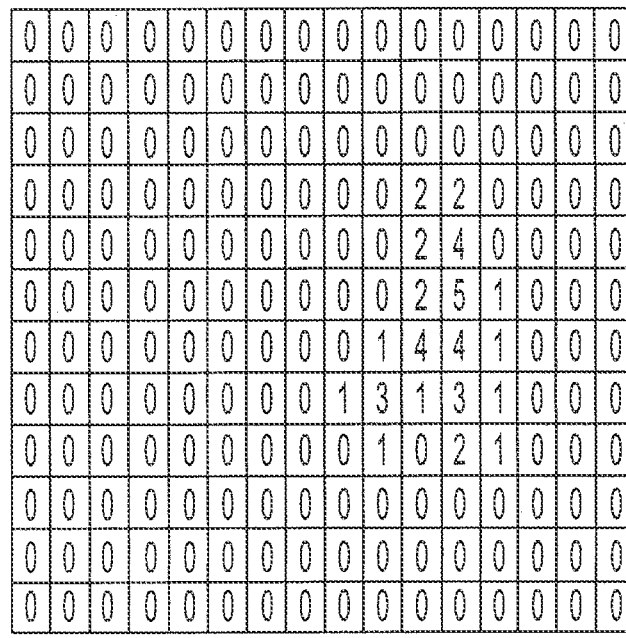
FIG. 17 is a plan view of the motion mask of FIG. 16 as modified by the virtual mask of FIG. 15.

One specific example of an application of the method of FIG. 14 is illustrated in FIGS. 15-17. FIG. 15 illustrates an image that has been acquired by camera 22 and that is being displayed on screen 38. The image includes a source of static motion in the form of a flag 200 that is rippling in the wind. The image also includes a moving object of interest in the form of a person 202 who is walking. It may be desirable for processing device 50 to identify person 202 as a moving object of interest and for camera 22 to follow the movements of person 202. That is, camera 22 may automatically track person 202 ("autotracking") in order to prevent the continued movement of person 202 from resulting in person 202 moving outside the field of view of camera 22.

A user of system 20 may view screen 38 and identify flag 200 as a potential source of static motion in the field of view of camera 22. In order to enable processing device 50 to track person 202 with little or no regard for the static motion of flag 200, the user may define a virtual mask 204 to "cover" the static motion of flag 200. That is, areas of the acquired image that are within virtual mask 204 include the source of static motion 200. The user may define virtual mask 204 by drawing a visual representation of virtual mask 204 on screen 38. In one embodiment, the user selects vertices A, B, C, D of mask 204 on screen 38 such as by use of joystick 36 or a computer mouse (not shown). After the user has selected vertices A-D, processing device 50 may add to the display visible boundary lines 206 which join adjacent pairs of the vertices.

Processing device 50 may analyze and compare a number of images that have been sequentially acquired to thereby sense movement within the acquired images. For example, by comparing the sequentially acquired images, processing device 50 may sense the movement of flag 200 and of person 202. More particularly, each of the images may be acquired as a matrix of pixels, as is well known. Processing device 50 may compare corresponding pixels in the sequentially acquired images in order to determine if the content of each particular pixel changes from image-to-image. If the content of a pixel does change from image-to-image, then it may be an indication that there is movement within that particular pixel.

Processing device 50 may quantify the degree or probability of movement in each pixel of the acquired images. FIG. 16 is one embodiment of a motion mask in the form of a matrix of motion values. Each motion value may correspond to a respective pixel of the acquired images, and may indicate the degree or probability of movement in the corresponding pixel.

Alternatively, in the embodiment shown in FIG. 16, each motion value may correspond to a sub-matrix of pixels measuring ten pixels by ten pixels or greater. That is, each motion value may indicate the degree or probability of movement in the corresponding cluster or group, i.e., "sub-matrix" of pixels. The motion values range from 0 to 5, with 0 indicating no likelihood or degree of movement, and 5 indicating the highest likelihood or degree of movement. Although the motion mask may be calculated before or after the user defines virtual mask 204, the motion mask of FIG. 16 is not modified by, i.e., is unaffected by, virtual mask 204.

In the embodiment shown in FIG. 16, most of the motion values are zero, but there are two clusters of non-zero motion values. The cluster of non-zero motion values in the upper left of the motion mask correspond to the rippling flag 200, and the cluster of non-zero motion values in the lower right of the motion mask correspond to the walking person 202.

In FIG. 16, a dashed-line representation of virtual mask 204 is superimposed over and around the motion values that correspond to the pixels, or sub-matrices of pixels, that are at least partially covered by virtual mask 204. The dashed-line representation of virtual mask 204 is included in FIG. 16 for illustrative purposes only, and virtual mask 204 is not included in any way in the motion mask.

After virtual mask 204 has been defined by the user and processing device 50 has created the motion mask, the motion mask may be modified by use of the virtual mask. More particularly, the motion values that correspond to pixels, or sub-matrices of pixels, that are at least partially "covered" by virtual mask 204 may be zeroed out by processing device 50.

FIG. 17 illustrates the motion mask of FIG. 16 after it has been modified by use of virtual mask 204. More particularly, the cluster of non-zero motion values in the upper left of the motion mask corresponding to the rippling flag 200 are zeroed out in FIG. 17 because the non-zero motion values correspond to, or are covered by, virtual mask 204. Thus, the effects of sources of static motion are removed from the motion mask.

Processing device 50 may analyze the modified motion mask in order to identify a moving object of interest in the acquired images in the form of a cluster of non-zero motion values. Processing device 50 may then cause camera 22 to execute pan, tilt and zoom movements that may be required to maintain moving object of interest 202 in the field of view of camera 22. For example, camera 22 may be instructed to pan to the right so that the cluster of non-zero motion values in FIG. 17 may be translated to a more centralized location within the camera's field of view. Thus, virtual mask 204 may be used by processing device 50 to more effectively automatically track a moving object of interest 202 without complications that may be caused by static motion in the field of view.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera system comprising:
   a camera having an adjustable field of view and configured to acquire images; and
   a processing device operably coupled to said camera and configured to:
      allow a user to define a virtual mask within the acquired images;
      track all motion that is located within the virtual mask with a reduced level of regard; wherein the reduced level of regard corresponds to all images located within the virtual mask having a reduced resolution in comparison to images located outside the virtual mask and wherein the reduced resolution does not completely block any of the images within the virtual mask.

2. The system of claim 1 wherein the acquired images include a plurality of pixels, said processing device being configured to track a moving object of interest in the acquired images with less regard for first ones of the pixels that are within the virtual mask than for second ones of the pixels that are outside of the virtual mask.

3. The system of claim 2 wherein said processing device is configured to track a moving object of interest in the acquired images with no regard for the first ones of the pixels that are within the virtual mask.

4. The system of claim 1 wherein said processing device is further configured to: sense movement within the acquired images and to create a motion mask based upon the sensed movement; modify the motion mask by use of the virtual mask; and identify the moving object of interest in the acquired images dependent upon the modified motion mask.

5. The system of claim 4 wherein the motion mask comprises a plurality of motion values, each of the motion values corresponding to at least one respective pixel in the acquired images.

6. The system of claim 1 wherein the processing device is configured to allow a user to define a virtual mask within the acquired images by drawing a visible representation of the virtual mask.

7. The system of claim 1 wherein the processing device is configured to allow a user to define a virtual mask within the acquired images by selecting a plurality of vertices of the virtual mask within the acquired images.

8. The system of claim 1 wherein the areas of the acquired images that are within the virtual mask include a source of static motion.

9. The system of claim 1 wherein said virtual mask defines a mask area completely encircling an unmasked area.

10. A method of operating a surveillance camera system, said method comprising:
    acquiring images with a camera;
    defining a virtual mask within the acquired images; and
    tracking all motion that is located within the virtual mask with a reduced level of regard, wherein the reduced level of regard corresponds to all images located within the virtual mask having a reduced resolution in comparison to images located outside the virtual mask and wherein the reduced resolution does not completely block any of the images within the virtual mask.

11. The method of claim 10 wherein the acquired images include a plurality of pixels, said tracking step comprising tracking the moving object of interest in the acquired images with less regard for first ones of the pixels that are within the virtual mask than for the second ones of the pixels that are outside of the virtual mask.

12. The method of claim 10 comprising the further steps of: sensing movement within the acquired images; creating a motion mask based upon the sensed movement; modifying the motion mask by use of the virtual mask; and identify the moving object of interest in the acquired images dependent upon the modified motion mask.

13. The method of claim 12 wherein the motion mask comprises a plurality of motion values, each of the motion values corresponding to at least one respective pixel in the acquired images.

14. The method of claim 10 wherein said defining step comprises drawing a visible representation of the virtual mask.

15. The method of claim 10 wherein said defining step comprises selecting a plurality of vertices of the virtual mask within the acquired images.

16. The method of claim 10 wherein the areas of the acquired images that are within the virtual mask include a source of static motion.

17. The method of claim 10 wherein said virtual mask defines a masked area completely encircling an unmasked area.

* * * * *